United States Patent
Geng et al.

(10) Patent No.: US 7,358,498 B2
(45) Date of Patent: Apr. 15, 2008

(54) SYSTEM AND A METHOD FOR A SMART SURVEILLANCE SYSTEM

(75) Inventors: Z. Jason Geng, Rockville, MD (US); C. David Tunnell, Palm Bay, FL (US)

(73) Assignee: Technest Holdings, Inc., Boston, MA (US)

( * ) Notice: Subject to any disclaimer, the term of this patent is extended or adjusted under 35 U.S.C. 154(b) by 312 days.

(21) Appl. No.: 10/912,430

(22) Filed: Aug. 4, 2004

(65) Prior Publication Data

US 2005/0029458 A1 Feb. 10, 2005

Related U.S. Application Data

(60) Provisional application No. 60/492,445, filed on Aug. 4, 2003.

(51) Int. Cl.
*G01J 5/08* (2006.01)
*G05G 11/00* (2006.01)

(52) U.S. Cl. ................. 250/347; 74/479.01
(58) Field of Classification Search ........... 250/347
See application file for complete search history.

(56) References Cited

U.S. PATENT DOCUMENTS

| | | | | |
|---|---|---|---|---|
| 4,542,986 A | * | 9/1985 | Berdanier | 356/5.04 |
| 4,746,906 A | * | 5/1988 | Lederer | 340/522 |
| 5,149,969 A | * | 9/1992 | Fouilloy et al. | 250/334 |
| 5,530,246 A | * | 6/1996 | Hawkins | 250/330 |
| 5,663,825 A | * | 9/1997 | Amon et al. | 359/201 |
| 5,726,747 A | * | 3/1998 | Houlberg et al. | 356/139.04 |
| 5,751,473 A | * | 5/1998 | Runciman | 359/356 |
| 5,936,771 A | * | 8/1999 | Cooper | 359/618 |
| 5,987,726 A | * | 11/1999 | Akeel | 29/407.08 |
| 6,020,994 A | * | 2/2000 | Cook | 359/365 |
| 6,587,265 B1 | * | 7/2003 | Endoh | 359/429 |
| 6,624,424 B2 | * | 9/2003 | Eckert et al. | 250/372 |
| 6,925,382 B2 | * | 8/2005 | Lahn | 701/223 |
| 7,129,460 B1 | * | 10/2006 | Olson et al. | 250/208.1 |
| 2002/0140829 A1 | * | 10/2002 | Colavin et al. | 348/231.99 |

* cited by examiner

*Primary Examiner*—David Porta
*Assistant Examiner*—David S Baker
(74) *Attorney, Agent, or Firm*—Steven L. Nichols; Rader, Fishman & Grauer PLLC

(57) ABSTRACT

A radiation surveillance sensor system includes a radiation responsive sensor, a lightweight, radiation reflective member for selectively adjusting the incident radiation path to the sensor, and power means for controlling the position of the reflective member to achieve pan, tilt, or zoom functions for obtaining predetermined selectable view locations of the sensor. Similarly, a method for selectively controlling deflection of radiation from a field to be monitored by generating a 360 degree panoramic field of view includes the steps of fixedly positioning a radiation sensor for receiving radiation from a field to be observed, movably positioning a mirror-like surface for selectively reflecting radiation from the field to be observed towards the sensor, and rotatably driving the reflective mirror to selectively reflect radiation from the mirror to the fixedly mounted sensor to achieve up to a 360 degree panoramic view.

31 Claims, 19 Drawing Sheets

SYSTEM AND A METHOD FOR A SMART SURVEILLANCE SYSTEM

RELATED APPLICATIONS

The present application claims priority under 35 U.S.C. § 119(e) from the following previously-filed Provisional Patent Application, U.S. Application No. 60/492,445, filed Aug. 4, 2003 by Geng et al. entitled "Smart Surveillance Sensor System" which is incorporated herein by reference in its entirety.

FIELD

The present specification relates to imaging mechanisms. More specifically, the present system and method relate to devices that utilize a reflective material to control the viewing direction and/or field-of-view of an optical sensor.

BACKGROUND

Security and surveillance are important to both individuals and companies. Traditionally, surveillance has been performed in person or using an image recording device such as an optical sensor monitoring a typically well lit area. More recently, night-vision technologies have allowed for the relatively easy surveillance of an object or area located in an obscure location. Additionally, traditional surveillance devices have developed the ability to rotate and/or vertically modify the viewing area of the image recording device using a combination of pan, tilt, and zoom capabilities.

There are currently a number of pan, pan-tilt, and pan-tilt-zoom camera systems available that involve the control of a small motor to physically move an optical sensor to accommodate a desired viewing location. These traditional vision systems employ one or more gimbaled units that provide for a pan/tilt motion of optical sensors having a significant size and weight payload package. Such sensor systems are characterized by heavy weight, a large size, any number of large motors and moving parts, a cumbersome size payload package, a fragile structure and mounting system that is not designed for high gravitational forces, provides a limited field of view, and is relatively expensive.

The above-mentioned characteristics of traditional day/night vision systems increase their complexity and make it difficult to control their precise movement. Additionally, traditional systems are limited in their uses due to the above-mentioned characteristics. For example, the heavy weight and large size of traditional day/night vision systems make it difficult, if not impossible to incorporate these traditional systems into remotely controlled vehicles and guidance systems. Similarly, the cumbersome size payload package and limited field of view cause difficulties for many security and surveillance applications. Consequently, traditional day/night vision systems have not been well suited for implementation in tactical robotic combat vehicles or other units performing Reconnaissance, Surveillance, and Target Acquisition (RSTA) missions.

SUMMARY

A radiation surveillance sensor system includes a radiation responsive sensor, a lightweight, radiation reflective member for selectively adjusting the incident radiation path to the sensor, and power means for controlling the position of the reflective member to achieve pan, tilt, or zoom functions for obtaining predetermined selectable view locations of the sensor.

Similarly, a method for selectively controlling deflection of radiation from a field to be monitored by generating a 360 degree panoramic field of view includes the steps of fixedly positioning a radiation sensor for receiving radiation from a field to be observed, movably positioning a mirror-like surface for selectively reflecting radiation from the field to be observed towards the sensor, and rotatably driving the reflective mirror to selectively reflect radiation from the mirror to the fixedly mounted sensor to achieve up to a 360 degree panoramic view.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

A number of exemplary systems, methods, and applications for utilizing a smart surveillance system are disclosed herein. More specifically, the present system and method relate to devices and methods that control a reflective material (mirror) to adjust the optical path of one or more substantially stationary optical sensors. By controlling the orientation of the reflective material rather than varying the position of the optical sensor, the present surveillance device has lower power requirements, a reduced size, and reduced weight when compared to traditional surveillance devices. A number of exemplary embodiments, optical surveillance configurations, and control and integration protocol are described in further detail below.

As used in the present specification and the appended claim, the term "optical sensor" is meant to be understood broadly as any sensor configured to detect variations in optical light waves. The optical light waves may be present in any spectrum including, but in no way limited to, visible, infrared, NIR (near infrared), SWIR (short-wave infrared), MWIR (mid-wave infrared), LWIR (long-wave infrared), etc.

In the following description, for purposes of explanation, numerous specific details are set forth in order to provide a thorough understanding of the present system and method for utilizing a smart surveillance system. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

As noted above, the present system and method enhance traditional surveillance devices by lowering power requirements, providing up to 360-degrees of wide field-of-view coverage, and reduce cost, size and weight. These advantages are accomplished by utilizing a unique mirror/sensor combination that uses a small motor to vary the orientation of a reflective mirror while controlling an agile mirror to direct the pan, tilt, and/or zoom function to a desired view location.

Figure 1:
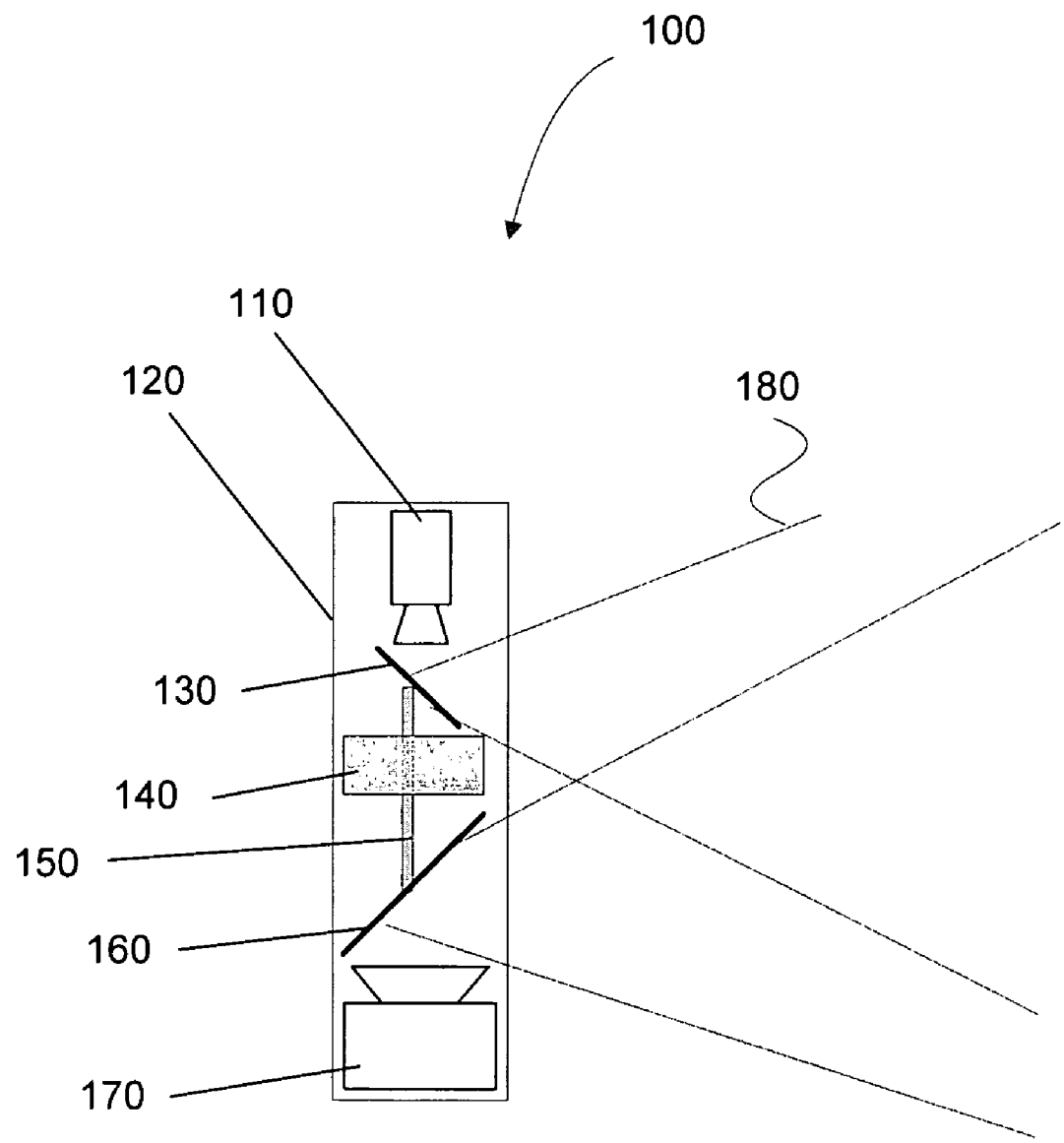
FIG. 1 is a simple block diagram illustrating an omni spin surveillance apparatus, according to one exemplary embodiment.

FIG. 1 illustrates an omni spin surveillance apparatus (100) according to one exemplary embodiment of the present system and method. As illustrated in FIG. 1, the omni spin surveillance apparatus (100) includes a plurality of light sensors such as a visible light sensor (110) and an infrared (IR) light sensor (170) fixedly coupled to a housing (120). Additionally, a first (130) and a second (160) reflective surface, such as a mirror, are disposed adjacent to the light sensors (110, 170). The first (130) and second (160) reflective surfaces are coupled to a motor (140) by a shaft (150) or other servo mechanism.

As will be described in further detail below, the components and configuration of the omni spin surveillance apparatus (100) eliminate the need for the traditionally large motors and sensors associated with moving electronic sensors. In contrast to traditional sensor moving systems, the present system and associated methods vary the optical field of view and amount of radiation (180) received at the light sensors (110, 170) by rotating the reflective surfaces (130, 160) rather than modifying the orientation of the light sensors (110, 170). Rotating the reflective surfaces (130, 160) rather than the light sensors (110, 170) allows the present system and associated methods to achieve higher speed capabilities, reduced weight, fewer sensors, and a smaller package than traditional systems. Additionally, the stationary sensor mounting configuration utilized by the present omni spin surveillance apparatus (100) and associated methods offers the flexibility to upgrade or change the light sensors (110, 170) used, without fear of matching the size/weight requirements of the motor (140).

As illustrated in FIG. 1, the present omni spin surveillance apparatus (100) is configured to house a plurality of sensors (110, 170) configured to receive and sense radiation (180) reflected from a rotatable mirror (130, 160). According to one exemplary embodiment, any number of sensors (110, 170) may be employed by the present system including, but in no way limited to, any cooled or uncooled focal-plane-array (FPA) detectors having more than one row of detectors, mega pixel sensors (having 1280×960, 2000×2000 and higher resolutions), complementary metal oxide semiconductor (CMOS) sensors, visible radiation light detectors, infrared (I/R) radiation detectors, traditional 680×480 pixel charge coupled device (CCD) sensors, high sensitivity microbolometer sensors, and the like.

Figure 2:
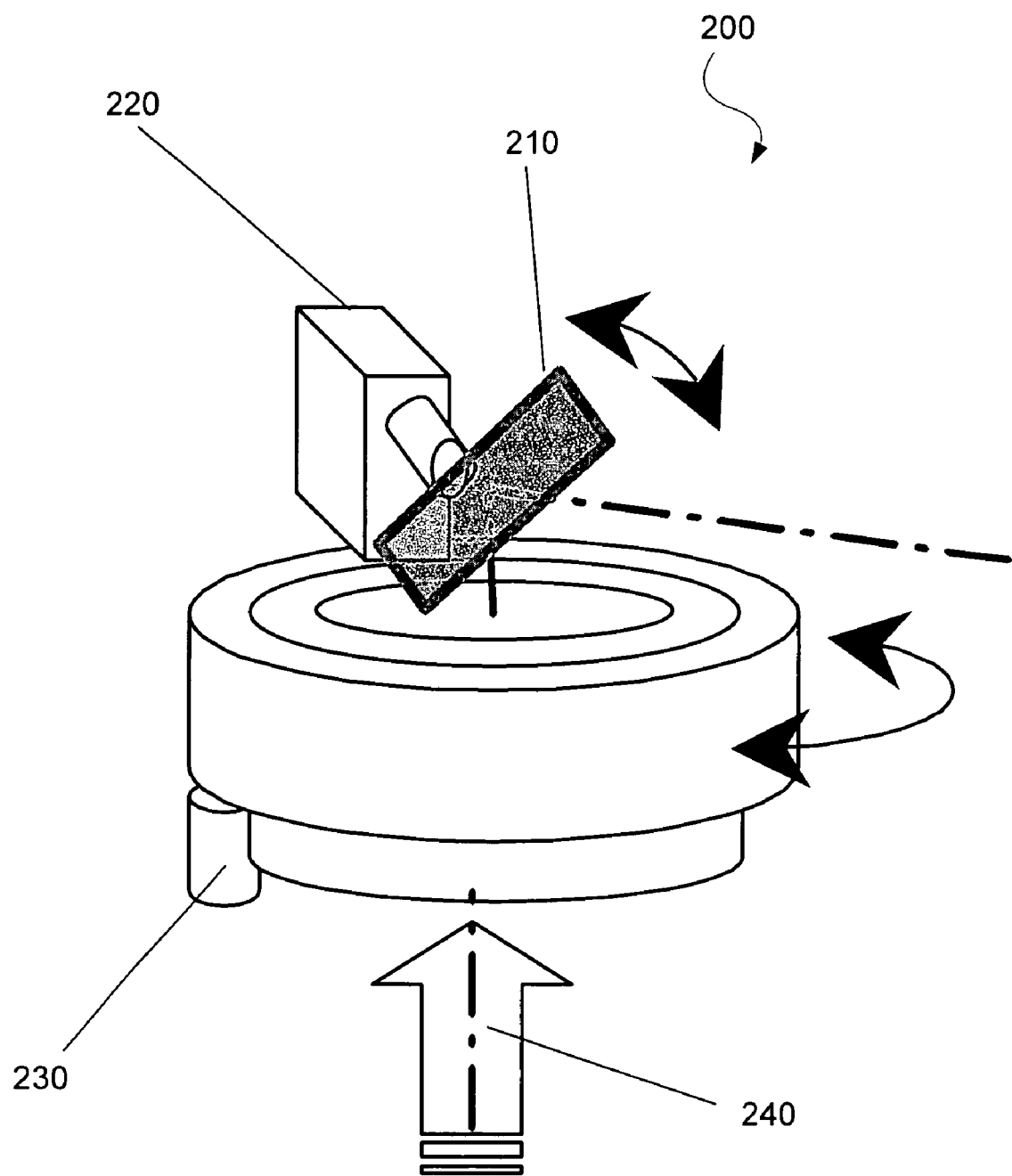
FIG. 2 is a simple perspective view illustrating a pan/tilt motor configured to orient a reflective surface, according to one exemplary embodiment.

FIG. 2 further illustrates a pan/tilt assembly (200) that may be incorporated with the present omni spin surveillance apparatus (100; FIG. 1), according to one exemplary embodiment. As illustrated in FIG. 2, the pan/tilt assembly (200) includes both a pan motor (230) configured to rotate about a first axis, and a tilt motor (220), coupled to the pan motor, configured to rotate about a second axis, the second axis being substantially perpendicular to the first axis. Additionally, a tiltable mirror (210) is coupled to a shaft of the tilt mirror motor (220). According to the exemplary embodiment illustrated in FIG. 2, the pan/tilt assembly (200) provides the same reflective functions from the sensor viewpoint (240) as the mirrors (130, 160; FIG. 1) illustrated in FIG. 1 with the addition of tilt functionality. Consequently, the combination of the pan/tilt assembly (200) with a zoom camera provides a full pan-tilt-zoom capability to the omni spin surveillance apparatus (100; FIG. 1). Additionally, the unique design illustrated in FIG. 2 provides a "Dual FOV" (Field-of-view) in a small form factor, allowing IR zoom as well as visible zoom capabilities, as will be described in further detail below with reference to FIGS. 4A through 7.

While traditional pan/tilt/zoom (PTZ) cameras use mechanical platforms to rotate the camera sensor head, the incorporation of the pan/tilt assembly (200) illustrated in FIG. 2 provides PTZ functionality with the rotation of only a small light-weight mirror while the sensor head stays still. This design concept of rotating a lightweight tiltable mirror (210) dramatically reduces the size and weight of moving parts while still achieving nearly the same results as a traditional gimbaled unit.

Figure 3:
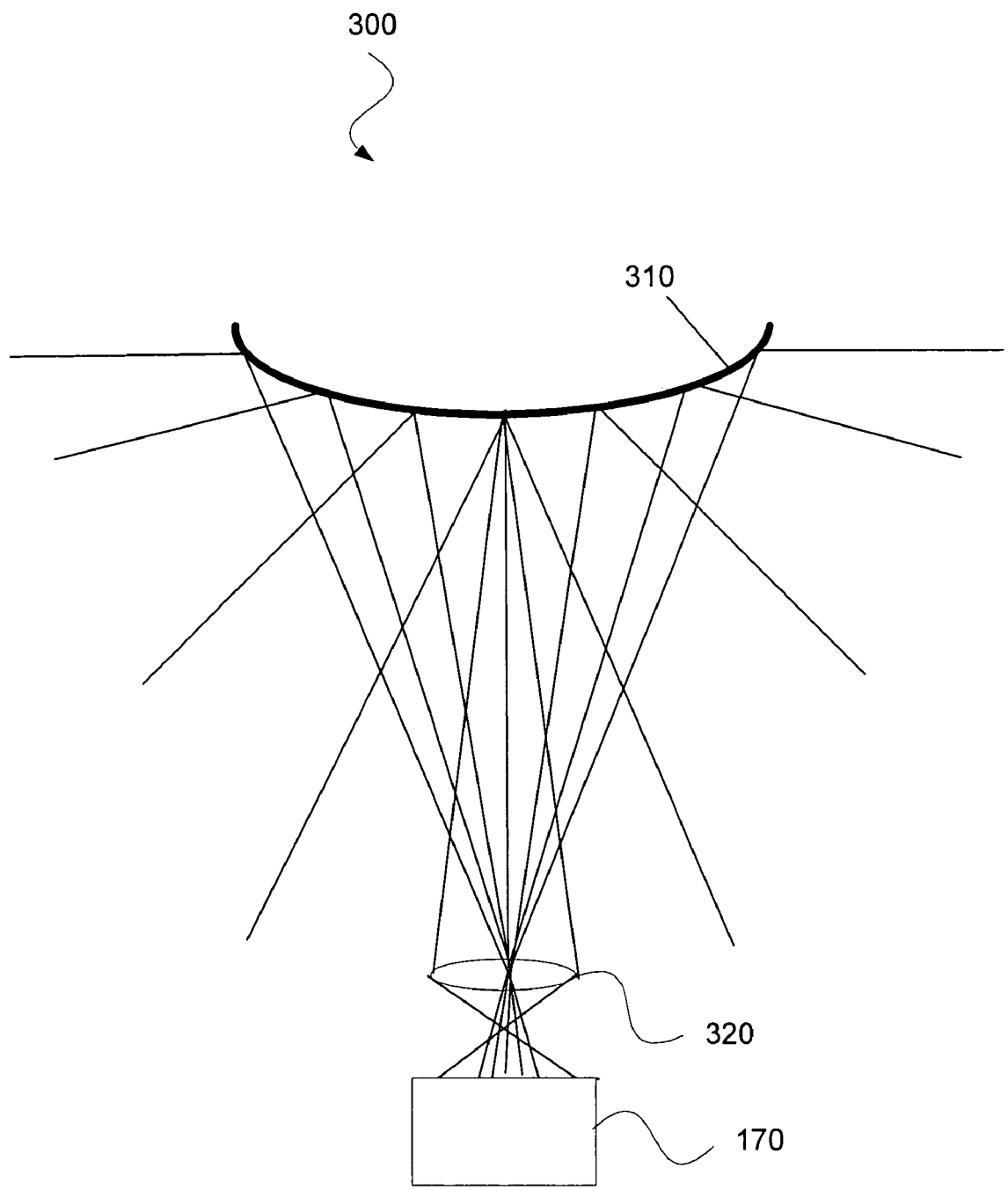
FIG. 3 is a simple block diagram illustrating a variable field of view sensor, according to one exemplary embodiment.

FIG. 3 illustrates an embodiment used to demonstrate the feasibility of 360-degree viewing capability in the IR spectrum. As illustrated in FIG. 3, the omniview system (300) includes a reflective hemispherical mirror (310) disposed adjacent to a lens (320) and an I/R sensor (170). In order to receive I/R radiation in the I/R sensor (170), the hemispherical mirror (810) is coated with a material having reflectivity within the I/R working wavelength. According to the exemplary embodiment illustrated in FIG. 3, as well as in the other I/R reflecting surfaces disclosed herein, the I/R reflective surface may be coated with, by way of example, a silver coating, an aluminum coating, and the like for reflectivity. Additionally, a coating of SiO may be applied for protection. Using the embodiment illustrated in FIG. 3, image reflectivity was demonstrated in both the visible and the I/R regions.

Optical imaging devices may be used for a number of purposes, each varying in scope. Often, varying activities using optical imaging devices benefit from having variable fields-of-view (FOV) available. That is, certain activities, such as maneuvering a vehicle, benefit from providing the user with a wide FOV so that peripheral objects and obstacles may be recognized. Additionally, there are a number of activities, such as weapons guidance, that benefit from providing a narrow FOV so that an identified target may be identified and tracked.

Figure 4A:
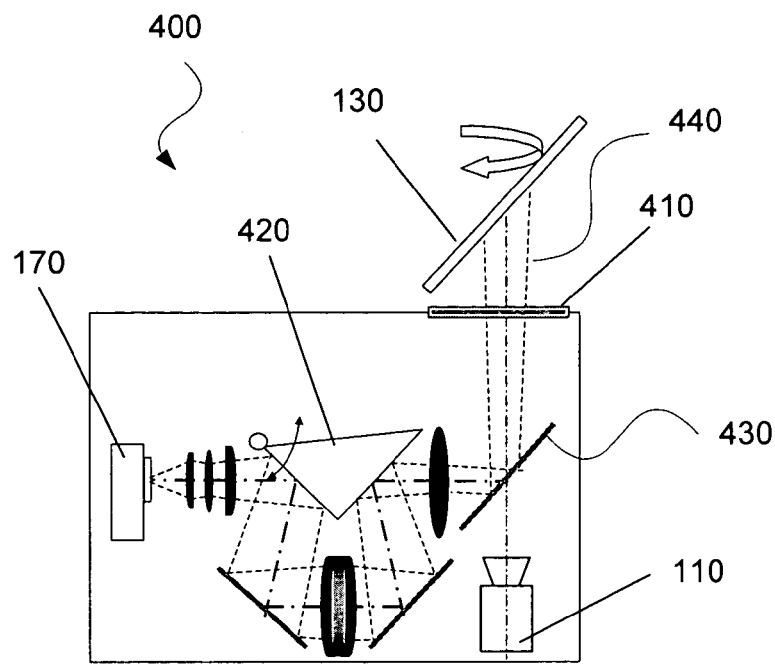
FIGS. 4A and 4B are simple block diagrams illustrating one method for varying the field of view experienced by a sensing device, according to one exemplary embodiment.
Figure 4B:
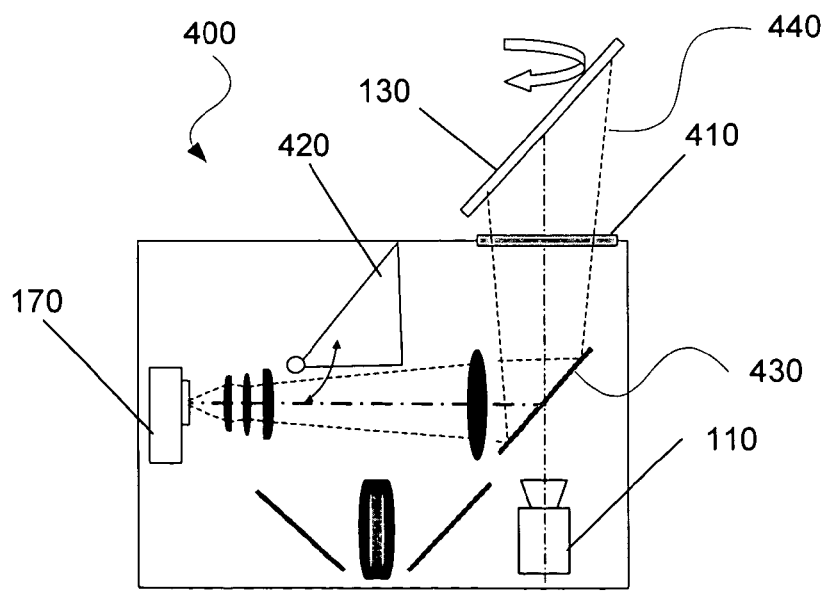

According to one exemplary embodiment illustrated in FIGS. 4A and 4B, a low-cost, high performance, and compact omni-scan module is designed incorporating coaxial optical path sharing using both the wide and narrow FOVs. As illustrated in FIGS. 4A and 4B, the FOV switching mirror system (400) includes a mirror (130) or other reflective surface that may be controllably rotated to direct radiation (180; FIG. 1) thought a lens (410) and onto a selectively reflective surface (430). According to one exemplary embodiment, the selectively reflective surface (430) is configured to pass visible light while reflecting other radiation.

As illustrated in FIG. 4A, the selectively reflective surface (430) is disposed adjacent to a visible light sensor (110) such that any visible light that is permitted to pass through the selectively reflective surface (430) is detected by the visible light sensor (110).

Additionally, as illustrated in FIGS. 4A and 4B, the FOV switching mirror system (400) includes a FOV switching mirror (420) that is configured to alter, in conjunction with a number of lenses, mirrors, or other optical devices, the field of view perceived by the I/R sensor (170). The FOV perceived by the I/R sensor (170) is varied by producing different optical paths, as described in further detail below. Typically, narrow FOV optics entail much longer optical paths than are used by the wide FOV optics. Utilizing this property, a dual position-switching mirror (420), actuated by an electric motor or mechanical device (not shown), has been designed to selectively modify the optical path sensed by the I/R sensor (170).

According to the exemplary embodiment illustrated in FIG. 4A, a narrow FOV may be presented to the I/R sensor (170) by introducing the dual position-switching mirror (420) into the optical path of the reflected radiation (440), as shown in FIG. 4A. With the dual position-switching mirror (420) disposed in the optical path of the reflected radiation (440), it is caused to pass though a number of alternative optical paths before it reaches the I/R sensor (170). The detour of the reflected radiation (440) introduces a longer optical path, for producing a narrow FOV.

In contrast, when a wide FOV is desired, the dual position-switching mirror (420) is removed from the optical path of the reflected radiation (440), resulting in a substantially direct optical path between the selectively reflective surface (430) and the I/R sensor (170). The resulting substantially direct optical path provides a relatively short path for a wide FOV optics. According to the exemplary embodiments illustrated in FIGS. 4A and 4B, the visible light sensor (110) and the I/R sensor (170) can share the same spinning mirror (130) in order to access the 360-degree FOV. Consequently, the number of moving parts is reduced, a single I/R sensor may be used for both wide and narrow FOVs, thereby reducing the hardware cost of system. Additionally, the exemplary embodiment illustrated in FIGS. 4A and 4B provide for automatic FOV alignment when switching between FOVs and provide for the possibility of pixel-to-pixel registration between electro optical (EO) and I/R images.

Figure 5A:
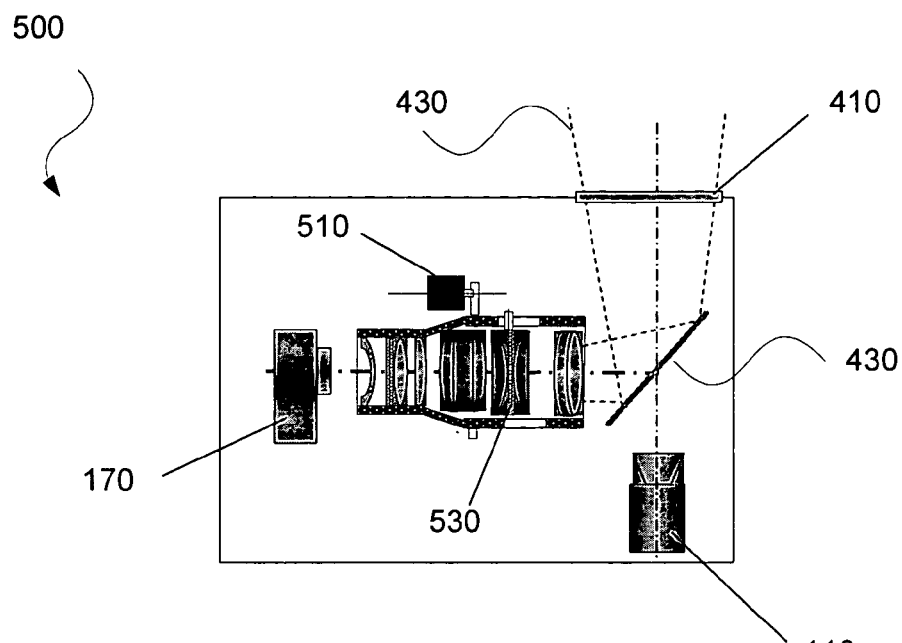
FIGS. 5A and 5B are simple block diagrams illustrating a method for varying the field of view experienced by a sensing device, according to one exemplary embodiment.
Figure 5B:
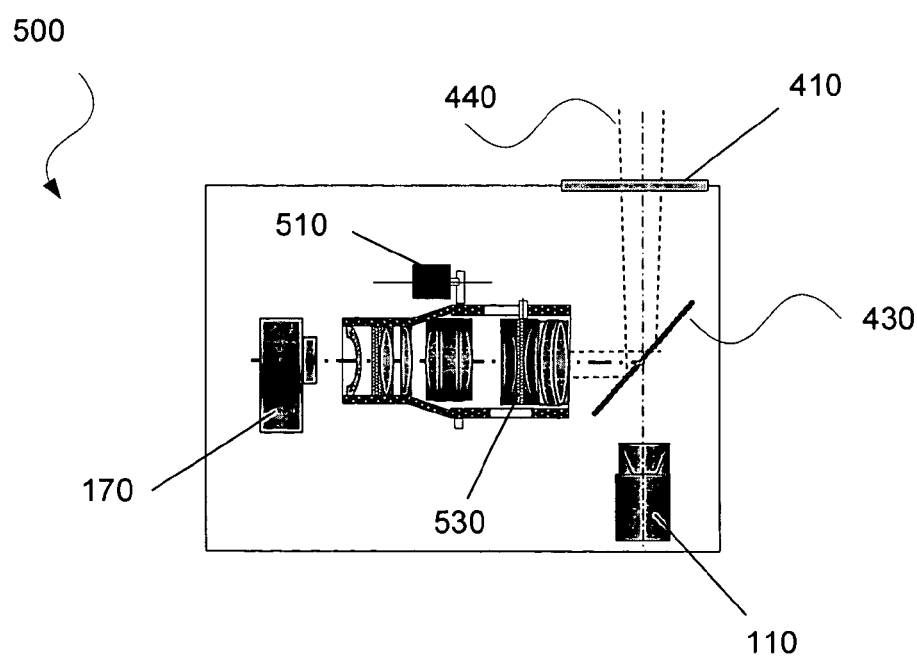

An alternative dual FOV embodiment is illustrated in FIGS. 5A and 5B. As illustrated, the axial position of a single lens (530) may be used to adjust the FOV experienced by an I/R sensor (170). According to the exemplary embodiment illustrated in FIGS. 5A and 5B, the axial position of a single movable lens (530) is varied by the controllable actuation of a motor (510) to adjust the FOV. Using precise optical design, the translational motion of the single moving lens (530) will switch the FOV perceived by the I/R sensor (170). The use of the FOV switching lens system (500) illustrated in FIGS. 5A and 5B provides compact and symmetrical design, reduces the hardware cost of the system, and provides that only the motion of one lens will achieve needed FOV switching.

Figure 6:
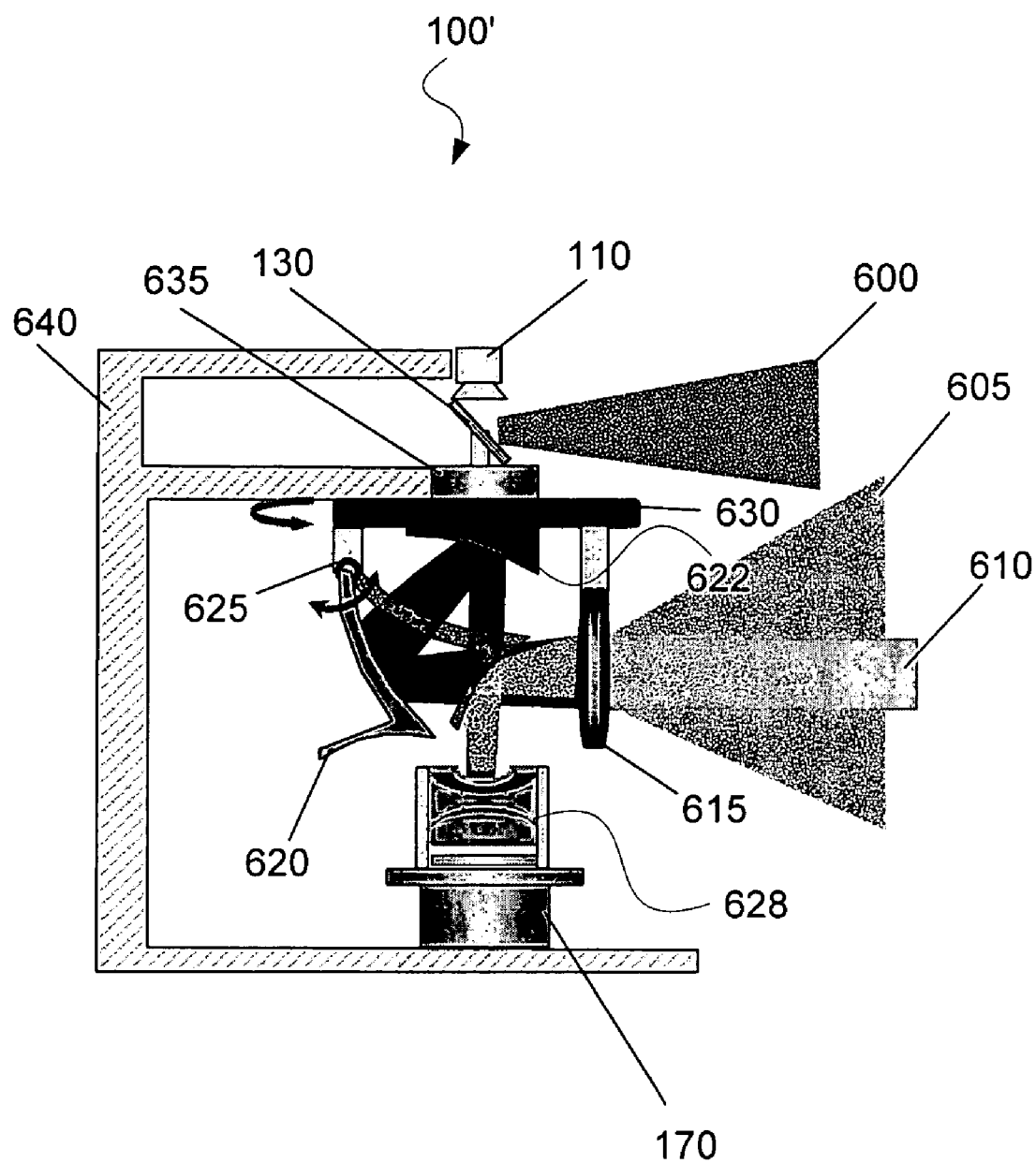
FIG. 6 is a simple block diagram illustrating an omni spin surveillance apparatus housed within a support structure, according to one exemplary embodiment.
Figure 7:
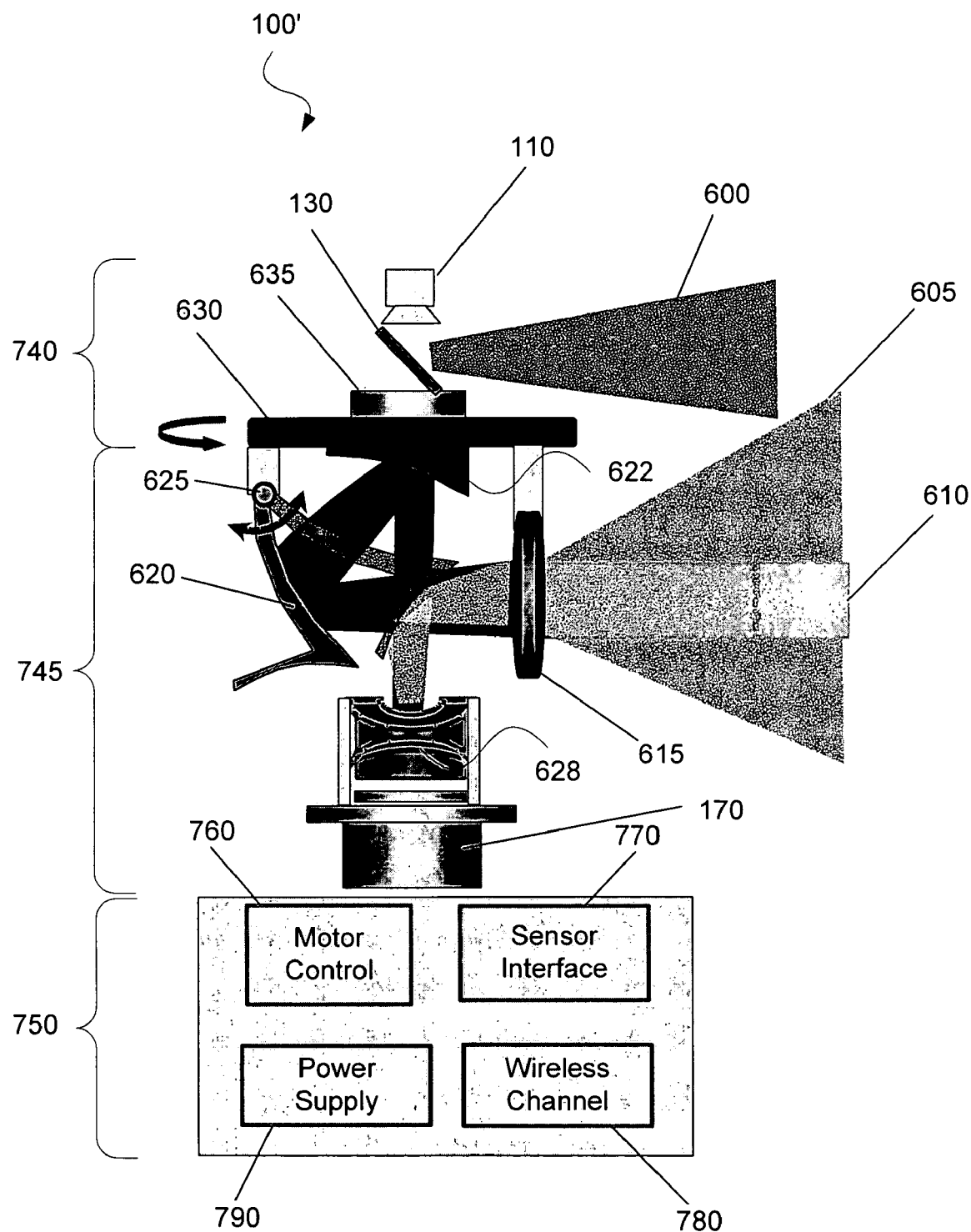
FIG. 7 is simple block diagram illustrating the independent components of an omni spin surveillance apparatus, according to one exemplary embodiment.

While the exemplary embodiments illustrated in FIGS. 4A through 5B provide efficient dual FOV optics, they may result in a higher than desired weight due to a large objective lens and may require a large spinning mirror to compensate for a varied optical center of the wide FOV. FIGS. 6 and 7 illustrate an exemplary alpha spin surveillance apparatus (100') that provides dual FOV capabilities in 360 degrees while avoiding the high weight and large mirror qualities of the previously mentioned embodiments. As illustrated in FIG. 6, the exemplary alpha spin surveillance apparatus (100') includes a visible light sensor (110) and an I/R sensor (170) coupled to a support structure (640). Disposed between the visible light sensor (110) and the I/R sensor (170) are a number of light weight optics coupled to a spinning rotary plate (630), such as a switching reflective mirror (620) coupled to the plate by a pivot (625), an objective lens (615), and narrow FOV optics (622); coupled to a motor assembly (635). Additionally, the motor assembly (635) is coupled to the support structure (640). The light weighted optics (615), (620), (622) and motor (635) are mounted on the spinning rotary plate (630) such that by rotating the spinning plate, 360-degree viewing capability is achieved.

When the alpha spin surveillance apparatus (100') is configured to receive a narrow FOV beam in the I/R sensor (170), the narrow FOV beam (610) first passes the objective lens (615) and strikes the surface of a reflective mirror (620). The beam (610) is bounced towards a narrow FOV optical mirror (622) mounted on a spinning rotary plate (630). The beam then goes to a stationary set of optical lenses (628) and into the IR sensor (170). This completes the optical path for the narrow FOV beams.

To switch to the wide FOV, a motor (635) actuates the reflective mirror (620) to a secondary homing position. In this position, the second surface of this "L" shaped reflective mirror (620) will reflect the wide FOV beams (605) directly towards the stationary optics (628) then into the IR sensor (170). As can be seen in FIG. 6, the secondary position of the "L" shaped reflective mirror (620) bypasses the narrow FOV optics (622).

FIG. 7 further illustrates the structure of the alpha spin surveillance apparatus (100'). As illustrated in FIG. 7, the apparatus (100') may be divided into three functional components: the visible light portion (740), the I/R light portion (745), and the control module (750).

According to the exemplary embodiment illustrated in FIG. 7, the visible light portion (740) of the alpha spin surveillance apparatus (100') is configured to reflect visible light rays (600) off of a reflective surface (130), such as a mirror, and into a visible light sensor (110). As shown in FIG. 7, the reflective surface (130) is rotatably coupled to the motor (635) such that it provides 360-degree viewing capability to the visible light sensor (110).

Similarly, as illustrated above, the I/R light portion (745) of the alpha spin surveillance apparatus (100') is configured to provide 360-degree viewing capability to the stationary I/R sensor (170). Additionally, the I/R light portion is configured to be selectively switched between providing narrow FOV rays (610) and wide FOV rays (605) to the stationary I/R sensor (170).

Further, FIG. 7 illustrates the control module (750) that is coupled to, and configured to control the alpha spin surveillance apparatus (100'). As illustrated in the exemplary embodiment of FIG. 7, the control module (750) includes, but is in no way limited to, a motor control (760), a sensor interface (770), a wireless channel (780) for the sensors (110, 170), and a power supply (790). According to one exemplary embodiment, the power supply (790) provides power to the motor (635) and the sensors (110, 170). Additionally, the motor control (760) is configured to provide servo commands to the motor (635), thereby controlling the rotation of the mirrors (130, 620), the objective lens (622), and the positioning of the switching reflective mirror (620) about the pivot point (625). The sensor interface (770) provides a graphical user interface, or other similar interface between a user and the sensors (110, 170). Additionally, the wireless channel (780) provides a medium of transmission for the images collected by the sensors (110, 170) as is well known in the art.

According to the exemplary embodiment illustrated in FIG. 7, the alpha spin surveillance apparatus (100') significantly reduces the size of the I/R optics assembly (745) for narrow FOV using overlapping folding optical path. Additionally, 360-degree viewing is capable without rotating the I/R sensor (170). Moreover, the use of the alpha spin surveillance apparatus (100') reduces the cost of optics, when compared to traditional systems, due to the use of reflective mirrors rather than Germanium lenses to provide fast and reliable switching between wide and narrow FOVs using a pop-up mirror to change the optical path. Moreover, a flat window can replace the large size objective lens.

Figure 8:
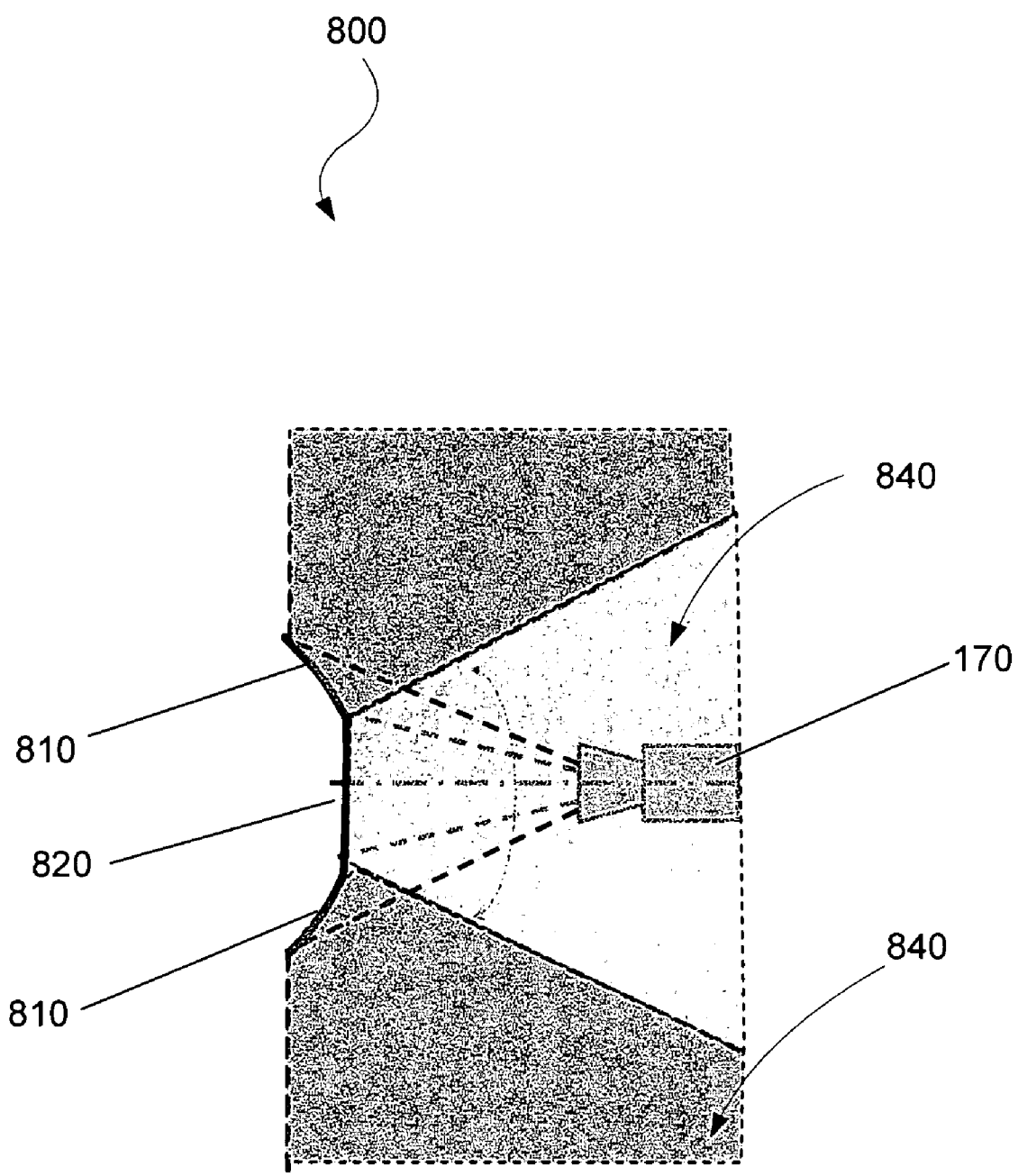
FIG. 8 is a simple top view illustrating a 180-degree field of view image receiver, according to one exemplary embodiment.

In addition to switching between wide and narrow FOVs, it is often beneficial to have "normal" 45-degree FOV real-time video images while providing additional low-resolution "peripheral vision" capability to enhance situation awareness. FIG. 8 illustrates an exemplary 180-degree FOV image receiver (800), according to one exemplary embodiment. As illustrated in FIG. 8, the 180-degree FOV image receiver (800) includes a reflective surface having a flat reflective surface (820) coupled on each end to a curved reflective surface (810). According to the exemplary embodiment illustrated in FIG. 8, the radiation that is reflected off of the flat reflective surface (820) provides a non-distorted FOV (340) to the I/R sensor (170), due to its flatness. Additionally, a wider FOV is provided by the curved reflective surface (810). According to the exemplary embodiment illustrated in FIG. 8, the curved reflective surfaces (310) are configured to reflect up to 180-degree FOV (340) back to the same image sensor (170). This curved mirror (310) offers a design advantage of achieving low-resolution peripheral vision using small areas on the perceived image.

Figure 9:
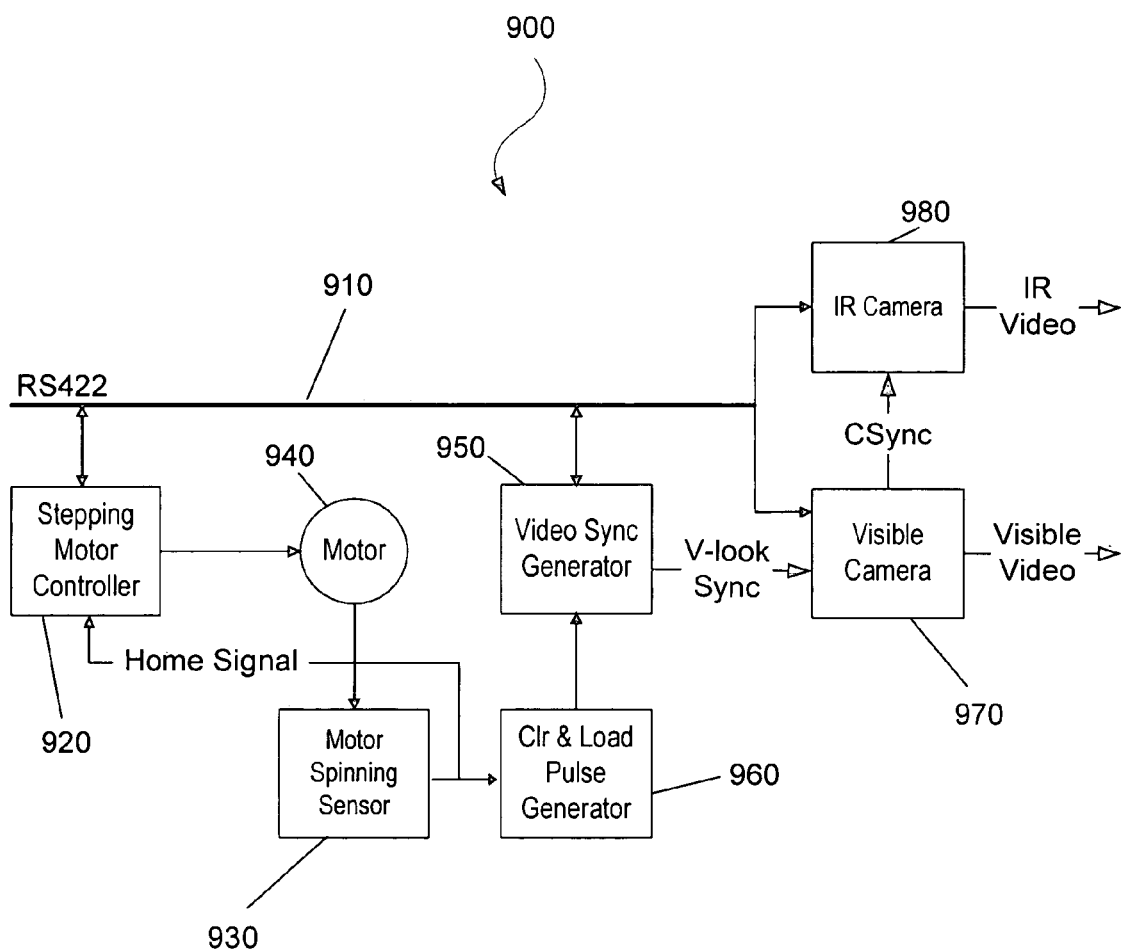
FIG. 9 is a simple block diagram illustrating an assembled surveillance structure, according to one exemplary embodiment.

Inherent with the integration of a plurality of light sensors (110, 170; FIG. 6) into a single alpha spin surveillance apparatus (100'; FIG. 6) is the matter of synchronizing the position of the rotating mirrors or reflective surfaces (130, 620; FIG. 6) with the image acquisition timing of the sensors (110, 170; FIG. 6). FIG. 9 illustrates a synchronization system design (900), according to one exemplary embodiment. As illustrated in FIG. 9, the I/R camera (980), the visible camera (970), a stepping motor controller (920), and the motor (940) are communicatively coupled through a serial transmission line (910). Additionally, as illustrated in FIG. 9, a motor spinning sensor (930) is coupled to the motor (940) to sense the motion of the motor. The motor spinning sensor (930) is also coupled to a video sync generator (950) through a current limiting resistor and load pulse generator (960). In turn, the video sync generator (950) is controllably coupled to the I/R camera (980) and the visible camera (970).

During operation, the stepping motor controller (920) generates a servo command that causes motion of the motor (940). This motion is sensed by the motor spinning sensor (930) and a signal representing the sensed rotation of the motor (940) is transmitted to the current limiting resistor and load pulse generator (960) where it is passed to the video sync generator (950). The signal received by the video sync generator (950) is interpreted by the video sync generator, and control commands are issued from the video sync generator to both the I/R camera (980) and the visible camera (970) synchronizing the position of the rotating mirrors or reflective surfaces (130, 620; FIG. 6) that are coupled with the motor (940) with the image acquisition timing of the cameras (970, 980).

Figure 10:
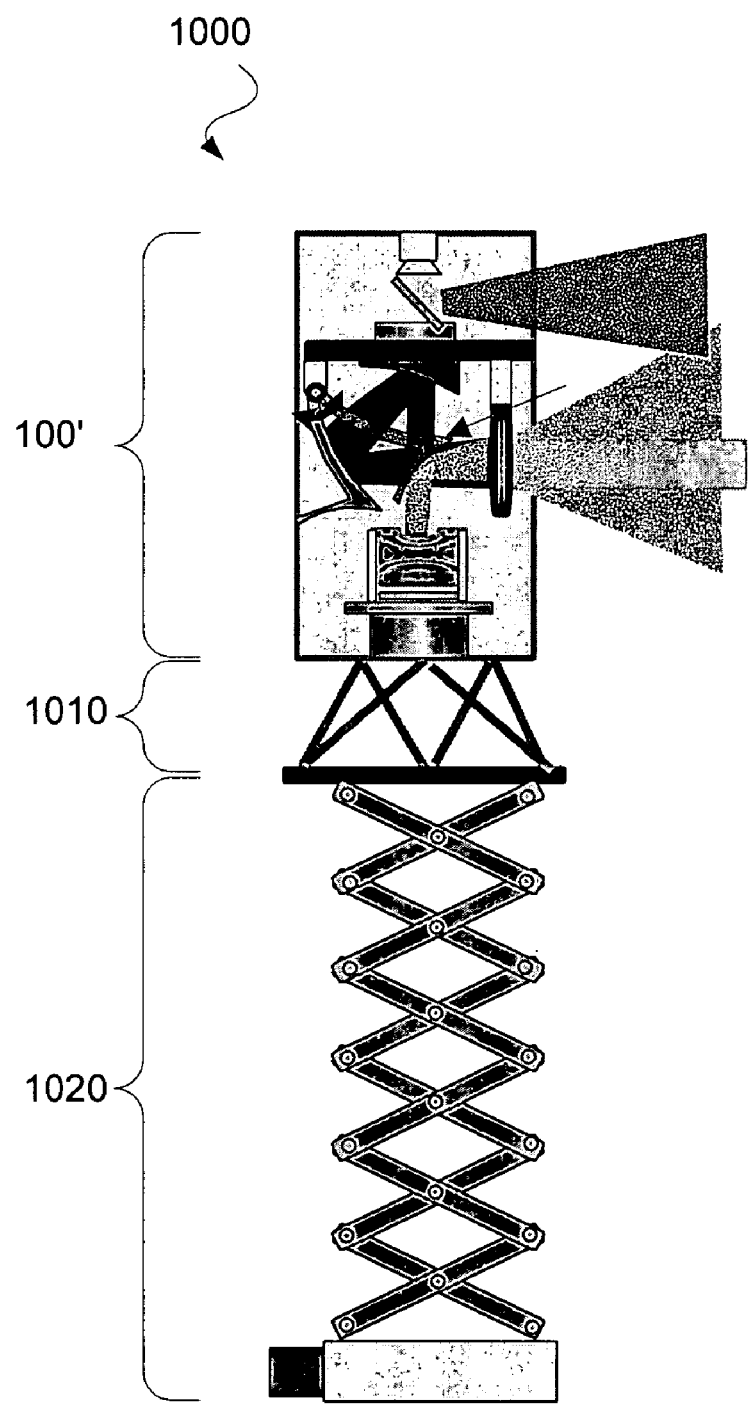
FIG. 10 is a perspective view illustrating a Stewart Platform according to one exemplary embodiment.

FIG. 10 illustrates the components of an assembled surveillance structure (1000) incorporating the alpha spin surveillance apparatus (100') according to one exemplary embodiment. As illustrated in FIG. 9, the assembled surveillance structure (1000) includes the alpha spin surveillance apparatus (100') coupled to a tilting and vibration suppression support mechanism (1010). Further, according to the exemplary embodiment illustrated in FIG. 10, the tilting and vibration support mechanism (1010) is disposed on a telescoping base (1020). According to the exemplary embodiment illustrated in FIG. 10, the assembled surveillance structure (1000) may elevate the alpha spin surveillance apparatus (100') to a desired vantage point while suppressing undesirable vibration.

According to the exemplary embodiment illustrated in FIG. 10, the coaxial design of the omni scan surveillance apparatus (100') that uses a single motor (635; FIG. 6) to control the scanning mirrors for both IR (170; FIG. 6) and visible sensors (110; FIG. 6) results in a slim structure allowing the omni scan surveillance apparatus to be encompassed onto the vertical telescoping base (1020). While the telescoping base (1020) is illustrated in FIG. 10 as a telescoping scissor structure, the telescoping base may assume any number of configurations including, but in no way limited to, a telescoping scissor structure, or a vertical telescoping pipe. According to one exemplary embodiment, the telescoping base may be raised to at least six to ten feet in height, allowing for the height adjustment of the alpha spin surveillance apparatus (100') such that image acquisition can be taken at different heights.

Additionally, as illustrated in FIG. 10, the alpha spin surveillance apparatus (100') is mounted on a tilting and vibration suppression support mechanism (1010) in the form of a modified Steward platform (hexapod) to provide tilting and vibration suppression capability. Further details of the exemplary tilting and vibration suppression support mechanism (1010) will be given below with reference to FIGS. 11 and 12.

Figure 11:
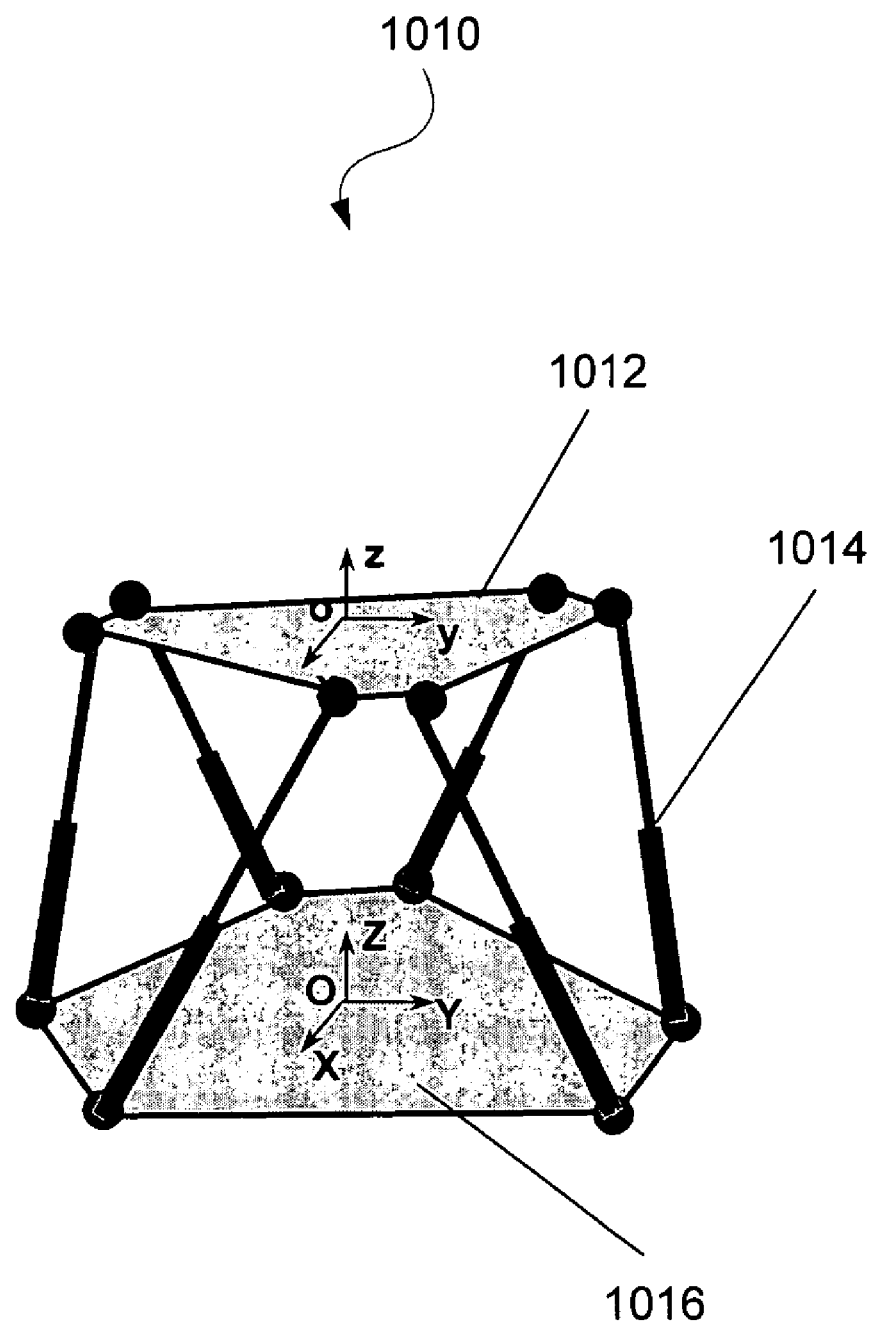
FIG. 11 is a perspective view illustrating a box configuration of a tilting and vibration support mechanism, according to one exemplary embodiment.

FIG. 11 illustrates a tilting mechanism that provides large angle tilting to augment the tilting capability of the alpha spin surveillance apparatus (100'), while providing both active and passive vibration suppression. As illustrated in FIG. 11, the tilting and vibration suppression support mechanism (1010) is a hexapod mechanism, called a Stewart platform, which includes a top platform (1012) and a base (1016) coupled by a small number of linear actuators (1014). While a number of Stewart platform configurations are illustrated in the present description, the vibration support mechanism (1010) may be any manipulator using an octahedral assembly of struts, having six degrees of freedom.

Stewart platforms have several unique features that make them particularly attractive for tilting and vibration suppression applications. The desirable features of Stewart platforms include, by way of example only, the use of the minimum number of linear actuators (1014) possible to provide 6 DOF motion, they have inherent capabilities of providing articulation between subsystems as well as vibration isolation with the same mechanical system, they can be designed to carry large loads and remain stable in the un-powered configuration, and neglecting the gravity and inertial load of actuators, all forces transmitted between the top platform (1012) and the base plate (1016) are totally axial forces of linear actuators (1014). This means that if the axial forces can be measured and eliminated, all the forces and hence all of the vibration created by these forces can be eliminated.

While there are an infinite number of possible geometric configurations for a Stewart platform, depending upon the selection of the positions of attachment points between actuators (1014) and plates (1012, 1016), the physical size of the top platform and base plate, as well as the range of actuator displacement; different configurations display different kinematic relationships and dynamic behaviors. For example; in certain configurations, the coupling effects between individual actuators (1014) can significantly degrade control performance. Moreover, it is even possible for a structure to become singular, where control becomes theoretically impossible. On the other hand, by tailoring the configuration of a Stewart platform, one can minimize the mechanical design effort and simplify control system design and implementation.

An optimal selection of the nominal configuration for a Stewart platform based structure is especially important in tilting and vibration suppression applications, since the displacement range of actuators (1014) are usually small compared to the dimension of the support mechanism (1010). The geometry of a support mechanism (1010) basically stays at the nominal configuration with only a small magnitude of change generated by the actuator's (1014) control action. Therefore, the nominal configuration will essentially define the kinematic relationship between actuators (1014) and support mechanism (1010) response.

Figure 12:
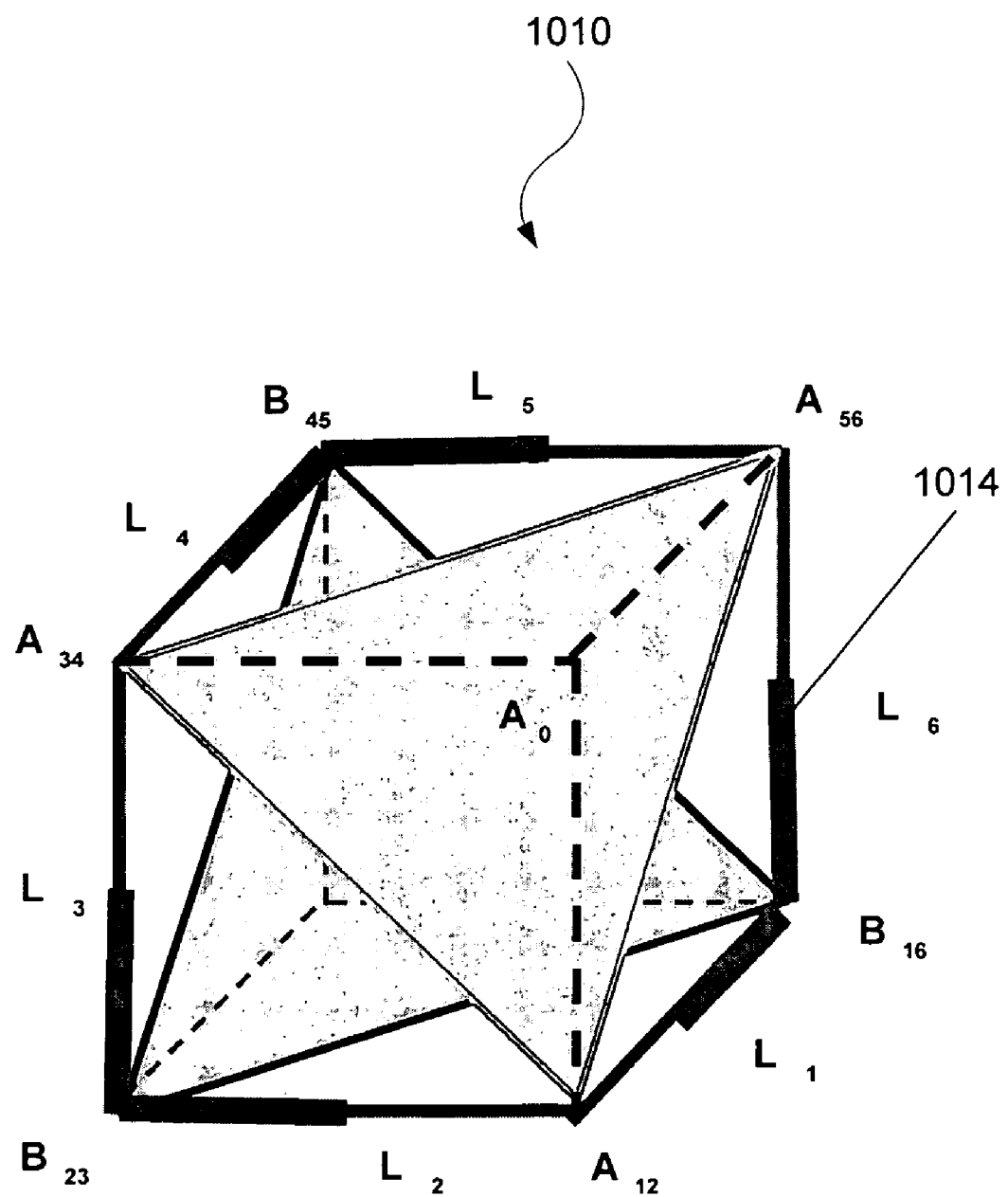
FIG. 12 is a simple block diagram illustrating a synchronization system, according to one exemplary embodiment.

FIG. 12 illustrates a tilting and vibration suppression support mechanism (1010) that produces active vibration control. According to the exemplary embodiment illustrated in FIG. 12, the "cubic configuration" of the tilting and vibration suppression support mechanism (1010) provides a simple and elegant method of providing controllable vibration suppression and tilt control. Traditional Stewart platforms have a generally complex kinematic and dynamic behavior due to the strong coupling of motions along different axes. That is, motion in any Cartesian direction requires motion of all of the legs, resulting in mathematical complexity in control system design. However, the "cubic configuration" illustrated in FIG. 12, for vibration suppression applications, eliminates much of this coupling and complexity.

As illustrated in FIG. 12, the tilting and vibration suppression support mechanism (1010) assuming the "cubic configuration" stems from the vertex arrangement of a cube. The cube has an edge length L. As illustrated, the eight corners of the cube shown in FIG. 11 are named as $A_0$, $A_{12}$, $A_{34}$, $A_{56}$, $B_0$, $B_{16}$, $B_{23}$, and $B_{45}$. Three vertex points: $A_{12}$, $A_{34}$, and $A_{56}$, determine a first plane (1212) as shown in the Figure as a light gray area, and points $B_{16}$, $B_{23}$, and $B_{45}$ form a second plane (1216) as shown by the dark gray area in FIG. 12. The two planes (1212, 1216) represent the base (1216) and top platform (1212) of the "cubic configuration." Notice that these two plates (1212, 1216) are in parallel. The connection between the top mobile platform (1212) and base plates (1216) comprises the six linear actuators (1014) aligning with corresponding edges of the cube, labeled $L_1$, $L_2$, ..., $L_6$ in FIG. 12. The attachment points of these linear actuators (1014) to the plates (1212, 1216) are the vertexes $A_{12}$, $A_{34}$, and $A_{56}$ on the top mobile platform (1212), and $B_{16}$, $B_{23}$, and $B_{45}$ on the base plate (1216), respectfully. Consequently, a top mobile plate (1212) containing attachment points $A_{12}$, $A_{34}$, and $A_{56}$, a base plate (1216) containing attachment point $B_{16}$, $B_{23}$, and $B_{45}$ and actuators (1014) $L_1, L_2, \ldots, L_6$ comprise our cubic configuration of the tilting and vibration suppression support mechanism (1010).

The "cubic configuration" of a Stewart platform illustrated in FIG. 12 has several unique features attractive to tilting and vibration suppression. Using the "cubic configuration" as the nominal configuration for multiple degrees of freedom (DOF) vibration suppression and tilting, the tilting and vibration suppression support mechanism will gain the advantages of: (1) The adjacent pairs of legs, or linear actuators (1014), are orthogonal to each other, resulting in the unique feature of decoupled control action in three translational motion directions X, Y, and Z. The orthogonality of the linear actuators (1014) guarantees that the motion of the top mobile plate (1212) in X, Y, and Z can be controlled independently by the pair of linear actuators (1014) which define that direction, without the involvement of the other four actuators. (2) The attachment points of each pair of linear actuators (1014) to both the base (1216) and top mobile plate (1212) are placed symmetrically, and the mobile and base plates parallel each other, providing a simple mechanical interface to host structures. (3) The nominal length of each of the legs, or linear actuators (1014) is equal, which greatly simplifies the actuator and sensor mount design. All six linear actuators (1014), plus the associated mounts, flex joints, and sensor locations can be chosen identically. (4) The motion sensors, which may include accelerometers, are mounted aligning with their corresponding actuator (1014) axis. The output signal of a sensor (not shown) from a sensor-actuator pair reflects only the motion along the axis of the linear actuator (1014), due to the fact that the adjacent leg axis is orthogonal. This feature facilitates the utilization of single input, single output (SISO) control algorithms for multiple diffractive optical element (DOE) vibration suppression problems. (5) The cubic configuration has maximum uniformity of control authority in all directions, assuming that all linear actuators (1014) have the same maximum force capability. The control authority is the maximum control force that can be applied along a certain direction. The uniformity of control authority is defined as the ratio of minimum control authority over maximum control authority of the structure in all possible directions. The maximum uniformity of control authority provides uniformly behaved control system in all directions. (6) The orthogonality of the "cubic configuration" simplifies the kinematic relationship between the motion of each linear actuator (1014) and that of the top mobile plate (1212). Generally speaking, the position and orientation of the top mobile plate (1212), denoted by a six element vector X, can be expressed as a function of the linear actuator (1014) length vector L by a nonlinear equation. Infinitesimally, the differential relationship between X and L is described by a 6×6 Motion Jacobian matrix:

$$dL = J^1 dX \qquad \text{Equation 1}$$

where dX represents a mobile plate displacement and dL represents the corresponding actuator length displacement. The Jacobian matrix also describes the relationship between force vector at the mobile plate and the forces applied by six actuators according to Equation 2 below:

$$f = J^T F \qquad \text{Equation 2}$$

A Jacobian matrix of a Stewart platform is a 6 by 6 matrix with nonlinear functions representing elements of the top mobile plate (1212) position and orientation. In general, none of the 36 terms in the Jacobian matrix are zero. In other words, any change in any leg, or linear actuator (1014), affects motions in all six degrees of freedom. However, the "cubic configuration" of the tilting and vibration suppression support mechanism (1010) illustrated in FIG. 12 causes a very significant simplification in the Jacobian matrix yielding a corresponding simplification in control. Since in a "cubic configuration" all the linear actuators (1014) have equal nominal length; i.e., $|L_i|=L$, i=1, 2 . . . , 6, the coordinates of the leg connecting points in the xyz coordinate system (see FIG. 3) are therefore:

$$A_{12} = \frac{L}{3}(1, 1, -2), \quad A_{34} = \frac{L}{3}(1, -2, 1), \qquad \text{Equation 3}$$

$$A_{56} = \frac{L}{3}(-2, 1, 1)$$

$$B_{23} = \frac{L}{3}(1, -2, -2), \quad B_{45} = \frac{L}{3}(-2, -2, 1),$$

$$A_{16} = \frac{L}{3}(-2, 1, -2)$$

The inverse of the Jacobian matrix can be found through the observation of the relationship between the force vector at the top mobile plate (1212) and the forces applied by the six linear actuators (1014), and expressed as the following:

$$\begin{bmatrix} \dot{L}_1 \\ \dot{L}_2 \\ \dot{L}_3 \\ \dot{L}_4 \\ \dot{L}_5 \\ \dot{L}_6 \end{bmatrix} = \begin{bmatrix} 1 & 0 & 0 & 0 & -2L/3 & -L/3 \\ 0 & 1 & 0 & 2L/3 & 0 & L/3 \\ 0 & 0 & 1 & -2L/3 & -L/3 & 0 \\ 1 & 0 & 0 & 0 & L/3 & 2L/3 \\ 0 & 1 & 0 & -L/3 & 0 & -2L/3 \\ 0 & 0 & 1 & L/3 & 2L/3 & 0 \end{bmatrix} \begin{bmatrix} \dot{u}_1 \\ \dot{u}_2 \\ \dot{u}_3 \\ \dot{u}_4 \\ \dot{u}_5 \\ \dot{u}_6 \end{bmatrix} \qquad \text{Equation 4}$$

As illustrated above in Equation 4, The Jacobian matrix of the "cubic configuration" illustrated in FIG. 12 is much simpler than that of a general configuration. The simplicity of the Jacobian results in easily predictable behavior of the system. As a result, the predictable behavior of the system also simplifies the analysis of system dynamics which directly results in increased computational efficiency of control.

It should be noted that if the platform moves significant distances from its nominal cubic configuration, then adjacent pairs of linear actuators (1014) will become non-orthogonal and some of the above mentioned features will no longer hold. However, the effect of this non-orthogonality will be small in the case of vibration suppression where the stroke of an actuator (1014) is much smaller than the leg length. As can be seen from the above-discussion, the "cubic configuration" has many advantages over the conventional configuration with respect to kinematic relationships, dynamic modeling, and mechanical design. Additionally, the "cubic configuration" illustrated in FIG. 12 allows for the combination of both active and passive elements to achieve high levels of vibration isolation and vibration suppression.

Figure 13:
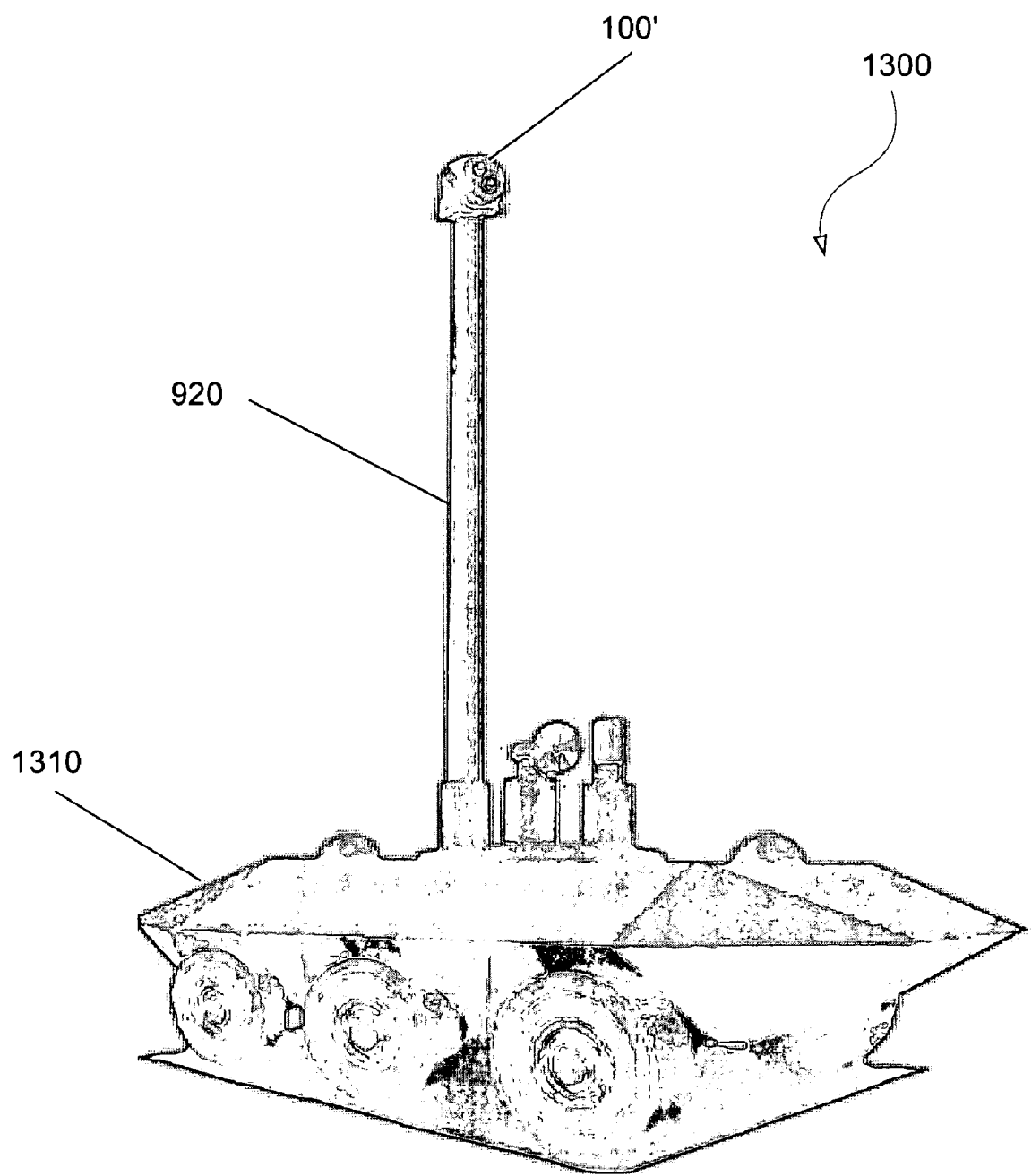
FIG. 13 is a perspective view of an exemplary surveillance vehicle incorporating the present omni spin surveillance apparatus, according to one exemplary embodiment.

According to one exemplary embodiment, the assembled surveillance structure (1000) illustrated in FIG. 10 is coupled to a vehicle (1310) to form a mobile surveillance configuration (1300), as illustrated in FIG. 13. According to the exemplary embodiment shown in FIG. 13, the mobile surveillance configuration includes, at least, the alpha spin surveillance apparatus (100') coupled to a telescoping base (920), which is in turn, coupled to a vehicle (1310). According to the exemplary embodiment illustrated in FIG. 13, the vehicle (1310) may include, but is in no way limited to, and unmanned remote vehicle, a manned vehicle, a boat or other floating vehicle, an all-terrain vehicle (ATV), etc.

According to one exemplary embodiment, the mobile surveillance apparatus (1300) includes a tele-operated robotic vehicle (1310). According to this exemplary embodiment, the alpha spin surveillance apparatus (100') includes a visible light sensor (110; FIG. 6) (400~700 nm) and a long wavelength infrared (7~14 nm) sensors (107; FIG. 6) as well as both wide FOV (605; FIG. 6) (45-degree) for driving and narrow FOV (610; FIG. 6) (9-degree) for target detection. According to this exemplary embodiment, there is no need to see both FOVs simultaneously, so a single I/R sensor (107) may be used to receive both the wide (605; FIG. 6) and narrow (610; FIG. 6) FOVs.

Due to the fact that the alpha spin surveillance apparatus (100') may be used for maneuvering a vehicle (1310), the operator can use the alpha spin surveillance apparatus to see both day and night to avoid obstacles. According to this exemplary embodiment, a substantially constant 45-degree frontal FOV should be maintained at a video frame rate of at least 15 frames-per-second (fps). "Fusing" the visible and IR images together to provide enhanced depth perception for driving at high speeds can significantly improve the user perception of driving in darkness, as will be explained in further detail below with reference to FIGS. 14 and 15

Figure 14:
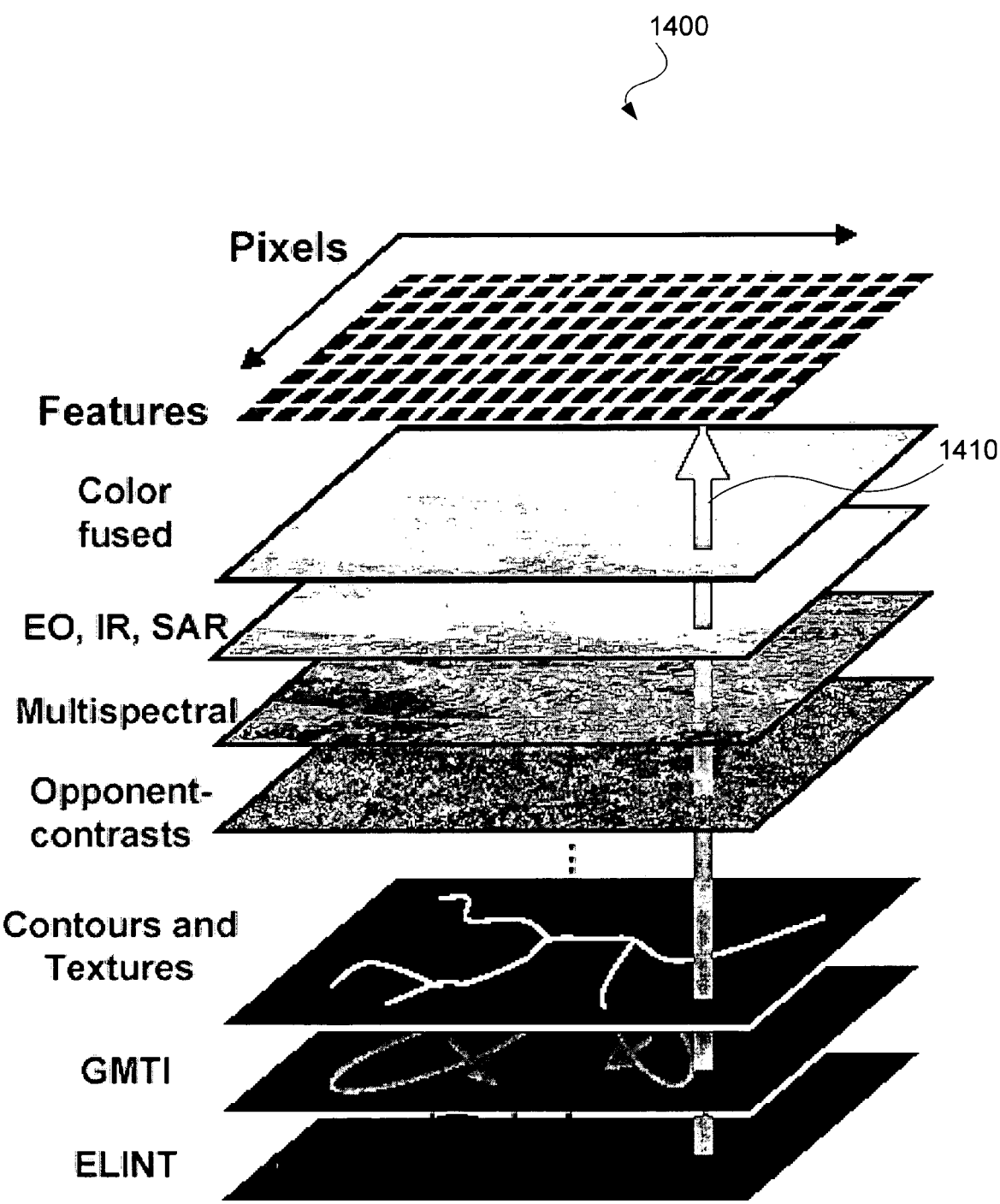
FIG. 14 is a flow chart illustrating a method for fusing visible and nonvisible light images, according to one exemplary embodiment.

As stated previously, fusion plays a major role in improving a user's perspective in driving at night and during inclement weather. In addition, fusion may improve reconnaissance, surveillance, and target acquisition (RSTA) performance for military applications. FIG. 14 illustrates one exemplary technique for seamlessly fusing visible and infrared images (360-degree or narrow FOV) together to provide the operator with better situational awareness when driving. As illustrated in FIG. 14, the seamless fusing operation (1400) includes receiving object information from a plurality of sensors that is then decomposed into data that is a combination of dependent and independent information. As illustrated in FIG. 14, the dependent and independent information may include, but is in no way limited to, contours and textures, opponent contrasts, electronic intelligence (ELINT), ground moving target indicator (GMTI), multi-spectral information, electro optical (EO), infra red (I/R), specific absorption rate (SAR), and/or color fused images. According to the exemplary embodiment illustrated in FIG. 14, the image fusion method constructs a representation of an object based on the summation of images obtained by multiple sensors that have minimal repetition of the common dependent information and maximal observation of the distinct independent information. As shown in FIG. 14, the summation may be performed on a pixel-by-pixel (1410) basis.

According to one exemplary embodiment, the image fusion may be performed according to one or more image fusion methodologies including, but in no way limited to, optical fusion which includes overlaying multiple images directly with optics, such as a dichroic beam-splitter; electronic fusion which includes combining multiple sensor output signals using analog video mixing hardware; and/or digital fusion including converting image signals into digital format and using digital image processing methods to fuse the images. While each of the above-mentioned fusion methods has associated advantages and disadvantages, the fusion method chosen may depend on the operator control unit (OCU) employed to display the resulting fused image.

Figure 15:
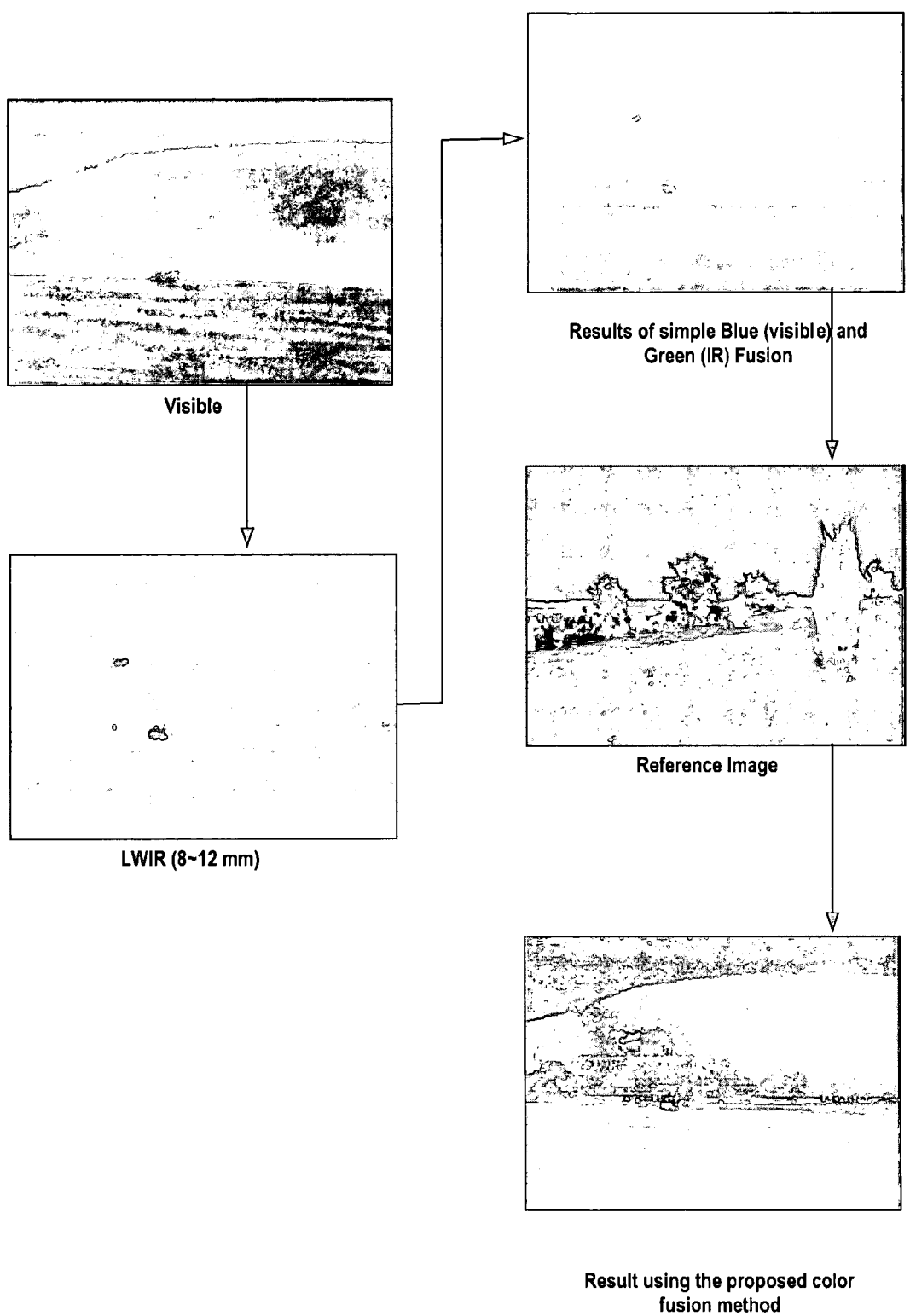
FIG. 15 is a method illustrating the fusing a number of images, according to one exemplary embodiment.

Assuming, according to one exemplary embodiment, that the display on the OCU is a color liquid crystal display (LCD), a method to generate false color displays that fuse both visible and IR images via color transfer methods as illustrated in FIG. 15. Using color space transformation, red-green-blue (RGB) images are converted to device independent XYZ coordinates according to the equation below:

$$\begin{bmatrix} X \\ Y \\ Z \end{bmatrix} = \begin{bmatrix} 0.5141 & 0.3239 & 0.1604 \\ 0.2651 & 0.6702 & 0.0641 \\ 0.0241 & 0.1228 & 0.8444 \end{bmatrix} \begin{bmatrix} R \\ G \\ B \end{bmatrix} \quad \text{Equation 5}$$

Additionally, assuming that there are up to three channels of inputs: long (L), middle (M), and short (S) wavelengths, the transformation matrix from XYZ to LMS cone space coordinates is shown below with reference to Equation 6:

$$\begin{bmatrix} L \\ M \\ S \end{bmatrix} = \begin{bmatrix} 0.3897 & 0.6890 & 0.0787 \\ 0.2298 & 1.1834 & 0.0464 \\ 0.0000 & 0.0000 & 1.0000 \end{bmatrix} \begin{bmatrix} X \\ Y \\ Z \end{bmatrix} \quad \text{Equation 6}$$

Combining these two transformations, we have $$\begin{bmatrix} L \\ M \\ S \end{bmatrix} = \begin{bmatrix} 0.3811 & 0.5783 & 0.0402 \\ 0.1967 & 0.7244 & 0.0782 \\ 0.0241 & 0.1288 & 0.8444 \end{bmatrix} \begin{bmatrix} R \\ G \\ B \end{bmatrix} \quad \text{Equation 7}$$

We estimate the skew components for LMS as:

$$L = \log L, \; M = \log M, \; S = \log S \quad \text{Equation 8}$$

Apply a generic de-correlating transformation determined from a large ensemble of natural images:

$$\begin{bmatrix} l \\ \alpha \\ \beta \end{bmatrix} = \begin{bmatrix} 1/\sqrt{3} & 0 & 0 \\ 0 & 1/\sqrt{6} & 0 \\ 0 & 0 & 1/\sqrt{2} \end{bmatrix} \begin{bmatrix} 1 & 1 & 1 \\ 1 & 1 & -2 \\ 1 & -1 & 0 \end{bmatrix} \begin{bmatrix} L \\ M \\ S \end{bmatrix} \quad \text{Equation 9}$$

If we think of the L channel as red, the M as green, and S as blue, then this $l\alpha\beta$ system is a variant of a color opponent model where:

Aly*

Achromatic Aly* ⇔ r+g+b

Aly*

Yellow-blue Aly* ⇔ r+g−b

Aly*

Red-green Aly* ⇔ r−g $\qquad$ Equation 10

We then remote the mean from LMS components $$\begin{bmatrix} l^* \\ \alpha^* \\ \beta^* \end{bmatrix} = \begin{bmatrix} l - \bar{l} \\ \alpha - \bar{\alpha} \\ \beta - \bar{\beta} \end{bmatrix} \quad \text{Equation 11}$$

and equal the standard deviation of the source and target images:

$$\begin{bmatrix} l'_s \\ \alpha'_s \\ \beta'_s \end{bmatrix} = \begin{bmatrix} \frac{\sigma^l_t}{\sigma^l_s} l^*_s \\ \frac{\sigma^\alpha_t}{\sigma^\alpha_s} \alpha^*_s \\ \frac{\sigma^\beta_t}{\sigma^\beta_s} \beta^*_s \end{bmatrix} \quad \text{Equation 12}$$

The above-mentioned fusion calculations may be automated by a software application. As illustrated above, the image fusion method is advantageous because only 6 parameters are needed (mean+stdev) to apply realistic daylight colors to multiband night vision imagery, up to 3 bands entails only simple matrix transformation, and more than 3 bands entail principal component analysis. While the present fusion method has been described in the context of fusing a number of RGB images, the present methods may also be used to fuse any number of images from imaging sensors including, but in no way limited to, $I^2$ (image intensification) sensors.

In addition to providing enhanced guidance of a vehicle, the present systems and methods may be used to identify targets as well as persons or objects of interest. According to one exemplary embodiment, the Johnson criteria are used to determine the adequacy of the target detection resolution. The Army Research Lab (ARL) has recommended the Johnson criteria as a uniform "standard" to characterize the sensor performance with respect to how many pixels are needed to "detect", "orient", "recognize" and "identify" various typical targets. The "Johnson Criteria" are listed below in Table 1:

TABLE 1

Johnson Criteria

| Target Boadside view | Resolution per maximum dimension | | | |
|---|---|---|---|---|
| | Detection | Orientation | Recognition | Identification |
| Truck | 0.9 | 1.25 | 4.5 | 8 |
| M-48 Tank | 0.75 | 1.2 | 3.5 | 7 |
| Stalin Tank | 0.75 | 1.2 | 3.3 | 6 |
| Centurion Tank | 0.75 | 1.2 | 3.5 | 6 |
| Half-Track | 1 | 1.5 | 4 | 5 |
| Jeep | 1.2 | 1.5 | 4.5 | 5.5 |
| Command Car | 1.2 | 1.5 | 4.3 | 5.5 |
| Soldier (Standing) | 1.5 | 1.8 | 3.8 | 8 |
| 105 Howitzer | 1 | 1.5 | 4.8 | 6 |
| Average | 1.0 ± 0.25 | 1.4 ± 0.35 | 4.0 ± 0.8 | 6.4 ± 1.5 |

Based on the Johnson Criteria illustrated above in Table 1, the average number of pixels needed to detect a target is 1.0±0.25, while the average number of pixels needed to recognize a target is 4.0±0.8. In order to resolve a High Mobility Multipurpose Wheeled Vehicle (HMMWV) (size of ~5 meters) at 5.7 km distance using an image sensor chip with 320 by 240 pixels with FOV of 9-degree, the target will be covered by at least two pixels (i.e., 2.243 meters per pixel). According to Johnson Criteria, this pixel count means that the sensor and optics must be able to "detect" and "orient" the target at that distance. In order to "recognize" the target, more pixels are needed. Human activity is covered by little more than one pixel in order to resolve stationary personnel (size of ~1.5 meter) at 3.8 km distance using the same image sensor chip. This meets the Johnson Criteria of "detection".

When selecting the proper sensors (110, 170; FIG. 6) for the alpha spin surveillance apparatus (100'; FIG. 1), the working wavelengths, the aperture (F-number), the field of view, and detector and pixel pitch resolution are considered to determine the resolving power of an optical system (either visible or IR).

Pixel pitch size and diffraction limited resolution parameter should be substantially matched when sensors are selected. For example, a 640×480 FPA with 25 microns pixel pitch is chosen, at 7-14 microns wavelength range, for F1.25 optical system, the diffraction limited resolution will be 11.4~21.3 microns. This would result in a good match between pixel pitch size and the diffraction limited resolution parameter. If, however, the diffractive limited resolution is smaller than the pixel pitch, some of the optical resolving powers are wasted, and vise versa.

Additionally, the larger the aperture, or the smaller the F-number of the sensor (110, 170; FIG. 6) selected, the better the resolving power of the optical system. The longer the working wavelength, the worse the resolving power of an optical system.

Moreover, if the FOV increases significantly, the resolving power of the sensor (110, 170; FIG. 6) drops accordingly. Consequently, with a 360-degree FOV, the pixel size increases dramatically. As a result, it is very difficult to achieve the required detection performance using a single sensor having a 360-degree FOV to accomplish long range detection. However, the present alpha spin surveillance apparatus (100'; FIG. 6) addresses both the sensor resolution and detection distance issues. Since simultaneous 360-degree coverage and target detection is not needed in many applications, all useful pixel resolution can be focused on areas of interest (AOI), once identified, to achieve long distance detection. Additionally, the unique spinning mirror (130, 620; FIG. 6) of the alpha spin surveillance apparatus (100'; FIG. 6) offers the operator the ability to look around an entire 360-degree FOV.

According to one exemplary embodiment, a state-of-the-art automatic target recognition (ATR) and tracking technique may be applied to the alpha spin surveillance apparatus (100') to perform video detection, tracking, and classification tasks based on unique 360-degree visible and I/R images. Once a target is detected, according to the exemplary embodiment, the location and characteristics of the target are compared with available information from other sensors (such as a laser range finder) to extract further information and trigger the appropriate measures. Meanwhile the sensors (110, 170; FIG. 6) continue to offer their global view of the scene and monitor any abnormal activity. Further details of the ATR and tracking technique will be given below.

The initial stage of the ATR and tracking technique is the extraction of moving targets from a received video stream. The present system and method may perform extraction of moving targets using any number of approaches including, but in no way limited to, temporal differencing (two-frame or three frame) as taught by Anderson et al, in *Change detection and tracking using pyramid transformation techniques, Proc. SPIE Intelligent Robots and Computer Vision, V*579, p 72 1985; background subtraction as taught by Haritaoglu, et al, *Who? When? Where? What? A real time system for detecting and tracking people, FGR*98, 1998; and/or optical flow as taught by Barrow, et al, *Performance of optical flow techniques, Int. J. Computer Vision,* 12(1):42, 1994, which are incorporated herein by reference in their entirety According to one exemplary embodiment, an adaptive background subtraction approach is used. According to this approach, when a video stream from a stationary camera is received, the intensity value at a pixel position x at time t=n is represented by $I_n(x)$. Using the three frame differencing rule, which suggests that a pixel is legitimately moving if its intensity has changed significantly in the past three consecutive frames, a pixel is moving if $(|I_n(x)-I_{n-1}(x)|>T_n(x))$ and $(|I_n(x)-I_{n-2}(x)|>T_n(x))$, where $T_n(x)$ is a threshold describing a statistically significant intensity change at the pixel x. While this approach detects intensity changes at the leading and trailing edges of objects being shown, the interior of an object cannot be detected. Consequently, if an object stops moving, it cannot be detected anymore.

Alternatively, a background reference image ('empty' scene) can be obtained and used for the background subtraction technique to detect the entire object. This approach allows detection of an entire object, moving or stopped, but is very sensitive to complex and changing environments (illumination, shadows, cloud, etc). Therefore, the background reference image must be adapted by the input sequence. According to one exemplary embodiment, $B_n(x)$ represents the current background intensity value at a pixel position x, at time t=n, as learned by an observation over time. Both the background model $B_n(x)$ and the difference threshold $T_n(x)$ are statistical properties of the pixel intensity observed from the image sequence $\{I_n(x)$ for $k<n\}$. $B_0(x)$ is initially set to the first background reference image and $T_0(x)$ is initially set to a non-zero value. B(x) and T(x) are then following the update laws given below:

$$B_{n+1}(x) = \begin{cases} \alpha B_n(x) + (1-\alpha)I_n(x), & \text{if } x \text{ is non-moving} \\ B_n(x) & \text{if } x \text{ is moving} \end{cases} ; \quad \text{Equation 13}$$

$$T_{n+1}(x) = \qquad \text{Equation 14}$$
$$\begin{cases} \alpha T_n(x) + (1-\alpha)(5 \times |I_n(x) - B_n(x)|), & \text{if } x \text{ is non-moving} \\ T_n(x) & \text{if } x \text{ is moving} \end{cases}$$

where α is a time constant that specifies how fast new information supplants old observations. If each non-moving pixel is considered as a time series, $B_n(x)$ is analogous to a local temporal average of intensity, and $T_n(x)$ is analogous to 5 times the local temporal standard deviation of intensity. Both are computed using an infinite impulse response (IIR) filter. This statistical model incorporates noise measurements to determine foreground pixels rather than a simple threshold, thus enhancing the robustness of the background subtraction algorithm.

While the above-mentioned adaptive background subtraction sufficiently detects an entire object, if any stationary object in the original reference background image is moved during the operation, it will leave behind a "hole" where newly acquired background image differs from the known background model, which may produce false alarms for a short period of time. Consequently, according to one exemplary embodiment, both the frame differencing and adaptive background subtraction methods are combined. That is, a frame differencing operation is used to determine regions of legitimate motion, followed by adaptive background subtraction to extract the entire moving region. This exemplary method efficiently extracts a moving target from a received video stream. Furthermore, the above-mentioned target detection, tracking, and classification methods may reliably detect targets in real-time Once detected, the alpha spin surveillance apparatus (100'; FIG. 6) may be used to build a temporal model of an event or activity performed by the target. To build the temporal model, individual objects are tracked over time. The first step in this process is to take the targets identified by the above-mentioned motion detection and match them frame-to-frame. Comparison of the frame-to-frame matching will manifest any temporal movement by the identified target. According to one exemplary embodiment, each target's history of motion is recorded separately and shown as a trace of the target on the user's screen, with different targets being represented by different colors for ease of identification.

Figure 16:
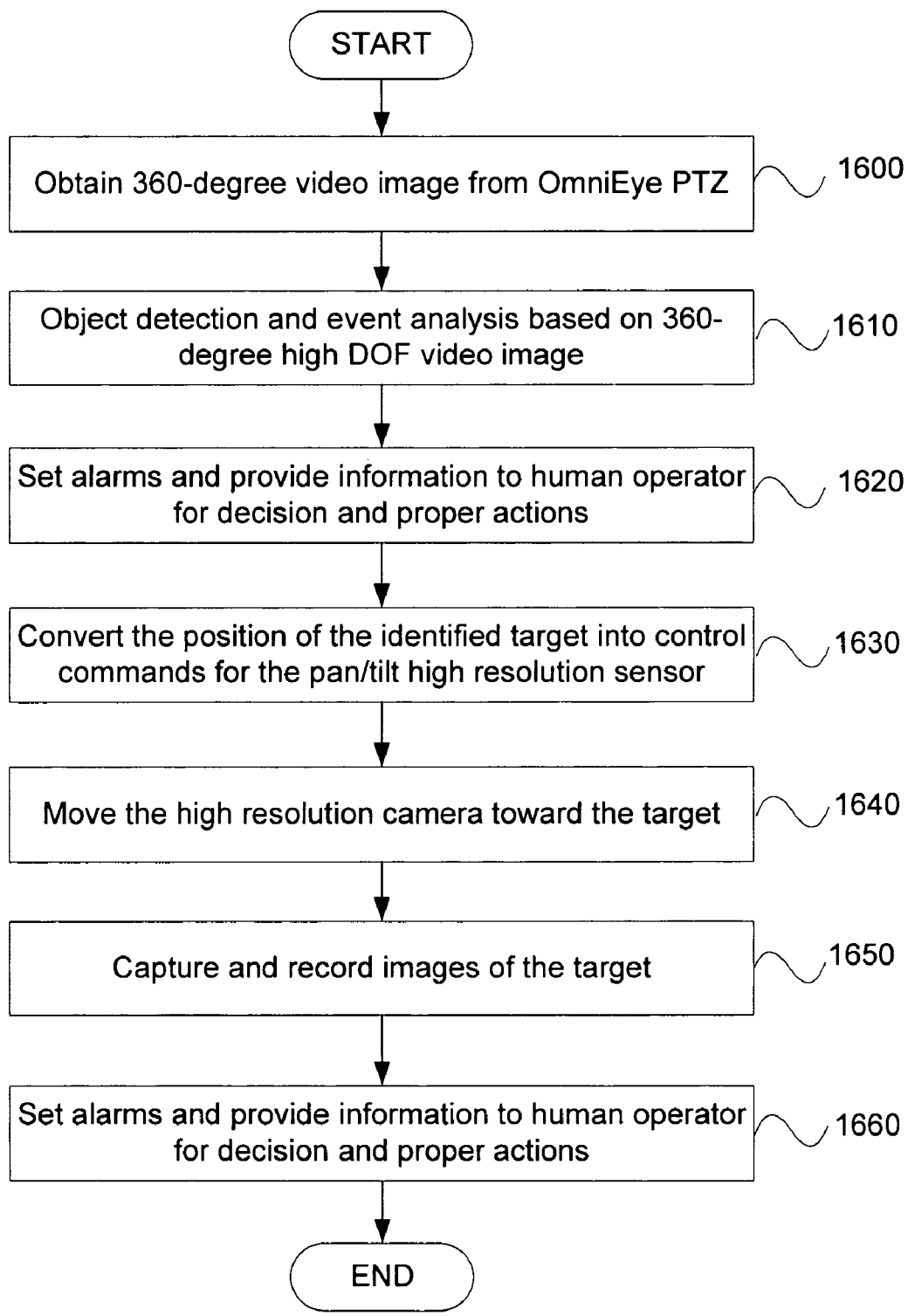
FIG. 16 is a flow chart illustrating a method for processing a plurality of captured target images, according to one exemplary embodiment.

As shown in the exemplary flowchart in FIG. 16, the above-mentioned detection and modeling of a target of interest may be performed, according to one exemplary embodiment, by first, obtaining a 360-degree video image from an omnieye PTZ or the alpha spin surveillance apparatus (100'; FIG. 6) (step 1600). Once the video image is obtained, the image may be used to perform object detection and event analysis (step 1610), as explained above. Additionally, a number of alarms may be set, such as pixel thresholds, an information reporting the meeting of alarm thresholds may be reported to an operator or computer system for evaluation and action determination (step 1620). Once the alarm thresholds are met, indicating the detection of a potential target, the position of the identified target is converted into control commands for the pan/tilt high resolution sensor (step 1630). According to one exemplary embodiment, the control commands may applied to either the visible light sensor (110; FIG. 6) and/or the I/R sensor (170; FIG. 6) of the alpha spin surveillance apparatus (100'; FIG. 6). Once the control commands are generated, one or both of the desired sensors (110, 170; FIG. 6) may be moved or aimed toward the identified target (step 1640). Once moved, the desired sensor(s) may then capture and record images of the target (step 1650) which may then be used to build a temporal model, as described above. Again, threshold levels and alarms may be set to indicate a movement of interest that should be reported to a human operator for decision and proper action (step 1660).

While the previously mentioned tilting and vibration suppression support mechanism (1010; FIG. 10) is configured to reduce vibration experienced by the alpha spin surveillance apparatus (100'; FIG. 6), vehicle motion, wind, and structural vibration may cause the support mechanism to be somewhat unstable. Consequently, video RSTA images are often shaky, causing human operators to fatigue rapidly when trying to adjust a camera to lock on a stationary or moving object. Furthermore, objects below a critical size can be impossible to identify when viewed by an unsteady source video, while easily recognized after the same video is electronically stabilized.

According to one exemplary embodiment, an effective feature point selection method based on Karhunen-Loeve Transform (KLT) techniques is used to track feature points in an image sequence. According to this exemplary embodiment, a feature is first selected from a received image. The feature may be identified as a textured patch of the image having a high intensity variation, for example, corners and spots on an image. During detection of the features, a [2×2] gradient matrix for each feature pixel is used to calculate the eigenvalues for the feature. If both of the eigenvalues exceed a predefined threshold, the features pixel is accepted as a candidate feature. This process is continued until a number of candidate features are identified for a single frame.

Once the evident features in a frame are selected, subsequent frames are searched for their counterparts around its previous position. By iteration, the displacement between the feature pixels, and consequently the features in subsequent frames are obtained.

Figure 17:
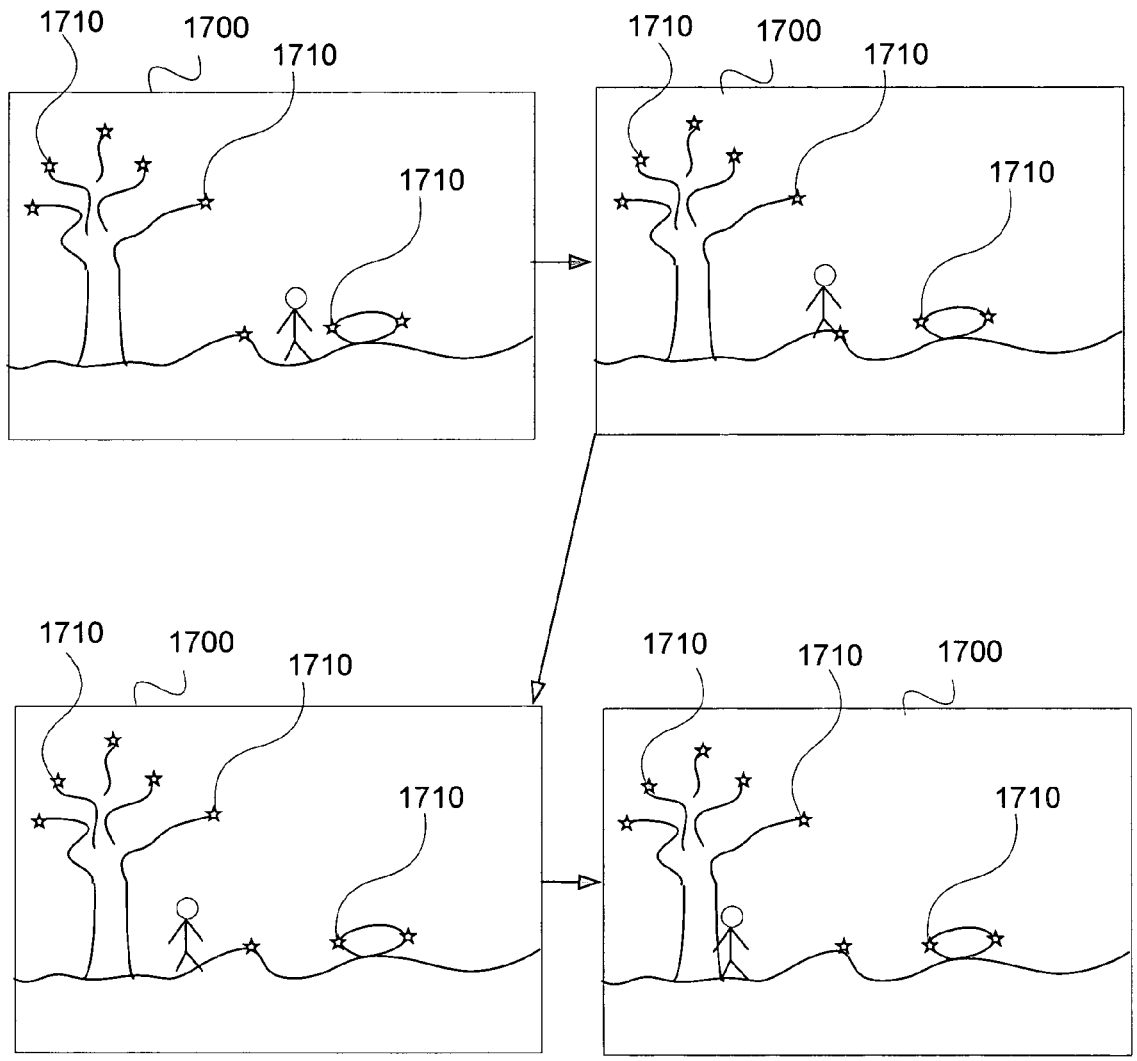
FIG. 17 is a simple frame diagram illustrating image stabilization using feature points, according to one exemplary embodiment.

FIG. 17 illustrates an example of feature extraction for inter-frame registration for successive frames. As illustrated in FIG. 17, feature points (1710) are selected in each frame (1700). As illustrated, the feature points (1710) are in substantially consistent locations in each frame (1700) due to only slight movement of the imaging sensor (110, 170; FIG. 6). The affine transformation between different images can be calculated using least mean square method based on the locations of these feature points (1700) to compensate for variations caused by vehicle motion, wind, and/or structural vibration.

Figure 18:
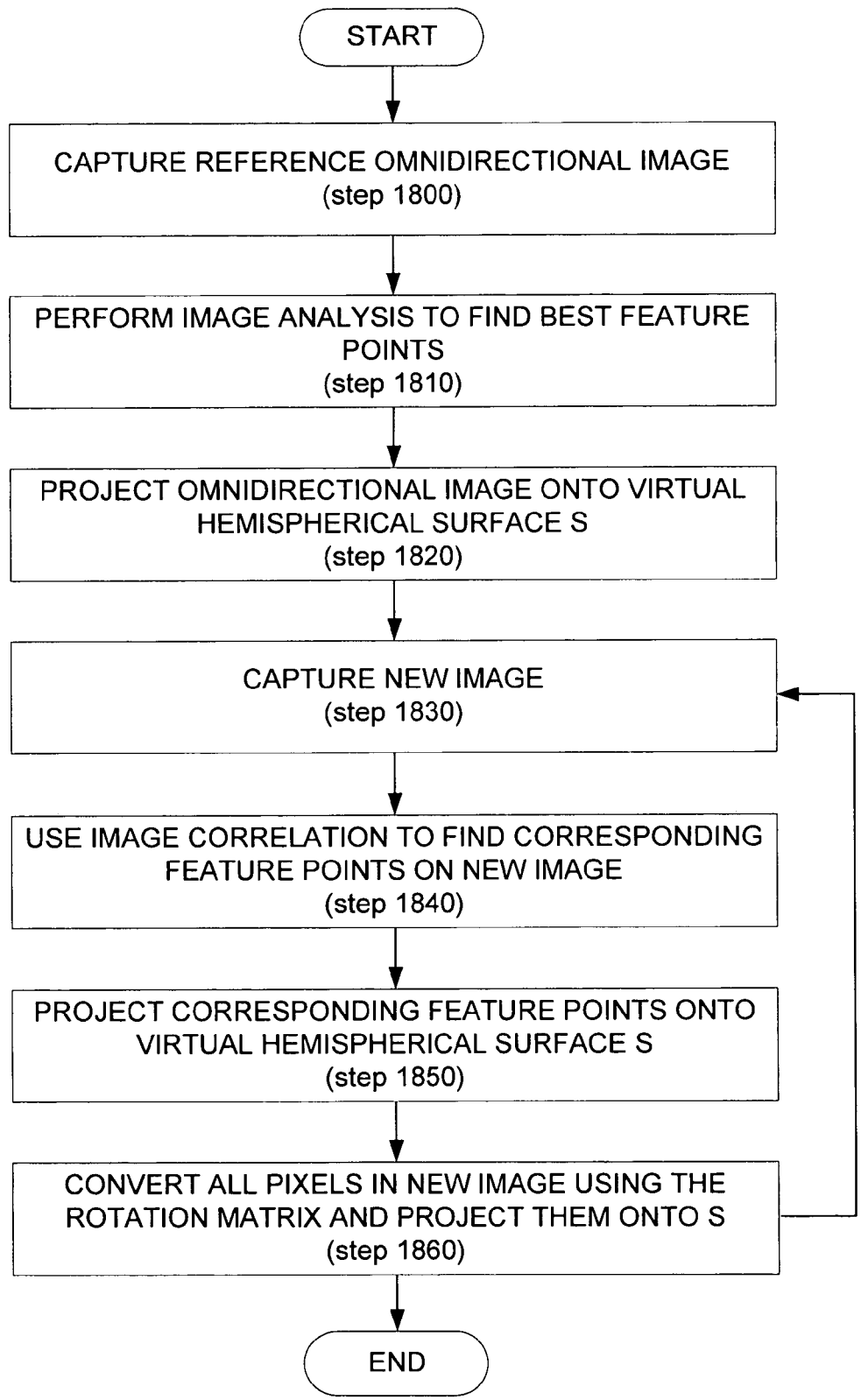
FIG. 18 is a flow chart illustrating a method for performing image stabilization with a hemispherical image, according to one exemplary embodiment.

FIG. 18 further illustrates a stabilization method for omnidirectional images. As illustrated in FIG. 18, general image stabilization techniques are not well suited for the omnidirectional camera, since general image stabilization techniques usually assume that the stabilization compensation can be achieved via an affine transformation illustrated in Equation 15:

$$p' = \begin{bmatrix} x' \\ y' \end{bmatrix} = \begin{bmatrix} a & b \\ c & d \end{bmatrix} \begin{bmatrix} x \\ y \end{bmatrix} + \begin{bmatrix} f \\ h \end{bmatrix} = Ap + q \qquad \text{Equation 15}$$

However, in omnidirectional images, such a linear transform relation does not apply. Therefore a more sophisticated method for image stabilization was developed.

As illustrated in FIG. 18, a software image stabilization scheme based on an efficient feature-tracking algorithm is configured to stabilize an omnidirectional video with displacements between frames and capable of generating a stable omni-image stream. According to the exemplary embodiment illustrated in FIG. 18, the present stabilization method begins by first, capturing a reference omnidirectional image $I_0$ (step 1800). Typically, the reference omnidirectional image is one of the first omnidirectional images in an omnidirectional video. Once captured, an image analysis is performed on the reference omnidirectional image $l_0$ to identify the best feature points (step 1810). Similar to the exemplary embodiment illustrated above, the best feature points are often textured patches of high intensity such as image points or edges. According to one exemplary embodiment, up to 20 best feature points are identified.

Once the feature points are identified, the omnidirectional image is projected onto a virtual hemispherical surface S using known OmniEye optical geometric relationshipS (step 1820) and a new image $I_n$ is captured (step 1830). Image correlation is then used on the newly captured image to find corresponding feature points $p'_i$, i=1, 2, ... M, on the new image (step 1840). Once identified, the feature points are then projected onto the same hemispherical surface S at locations corresponding to their related features (step 1850). The 3×3 rotation matrix $R(\alpha,\beta,\gamma)$ between two images can be obtained by solving the overconstrained equation using pseudoinverse: $[p'_1\ p'_2\ \ldots\ p'_m] = R(\alpha,\beta,\gamma)\ [p_1\ p_2\ \ldots\ p_m]$ followed by a projection of all the pixels in the new image $I_n$ using the rotation matrix.

Figure 19:
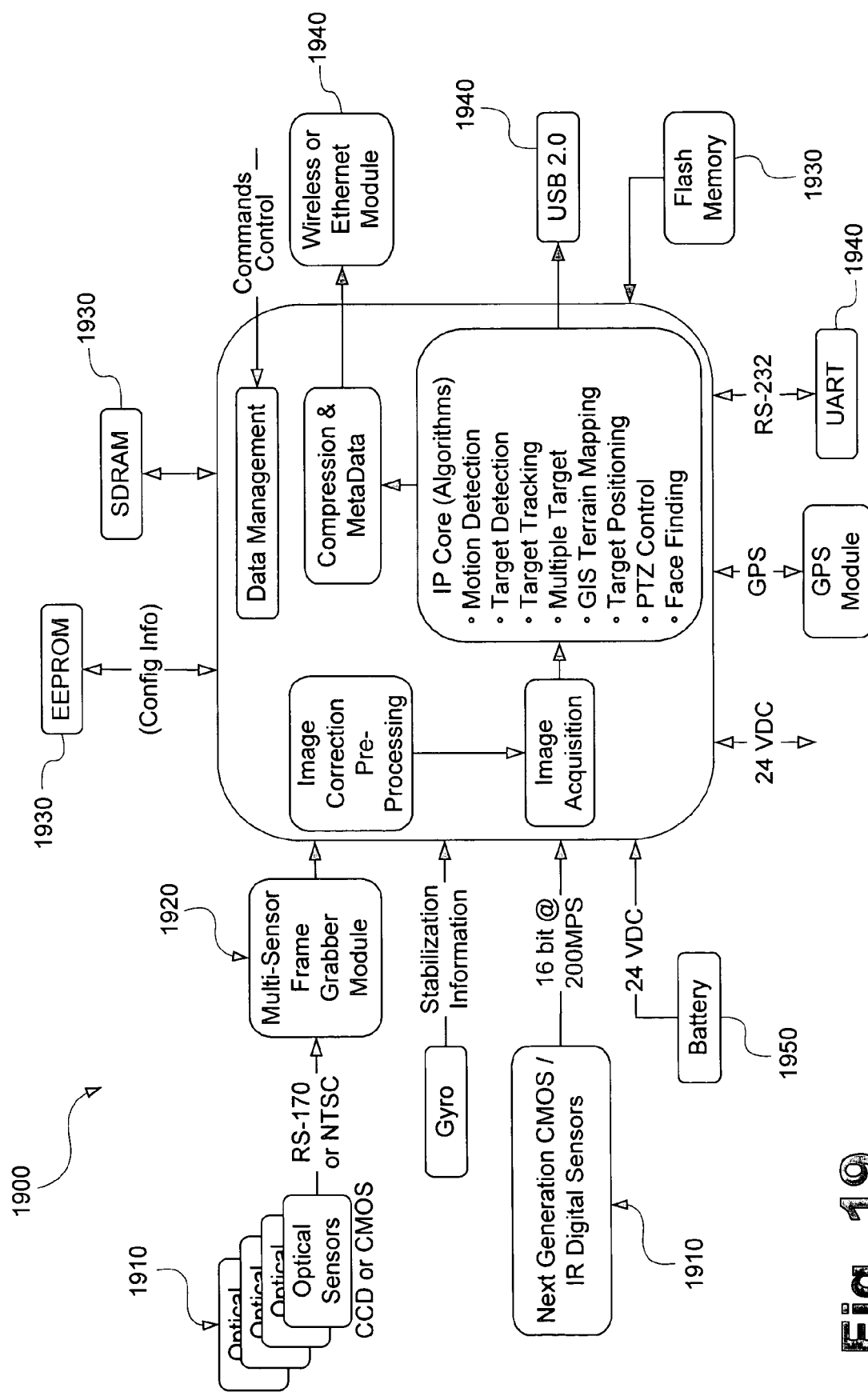
FIG. 19 is a functional block diagram illustrating the functions of a smart optical sensor, according to one exemplary embodiment.

Utilizing the above-mentioned image acquisition and correlation techniques, as well as emerging imaging technologies, a purely digital optical imaging system operating at well above the video rate of 30 frames per second can be produced with lower power, lower cost, and a within a small, compact form factor. FIG. 19 illustrates a simple block diagram illustrating the components of a smart optical sensor (SOS) (1900), according to one exemplary embodiment. According to the exemplary embodiment illustrated in FIG. 19, the SOS (1900) can receive high speed digital imaging directly from the optical sensors (1910), where image processing can be performed utilizing IP cores. By designing the SOS (1900) to receive digital inputs directly from the sensors (1910), large FIFO memory and dedicated multiplier blocks can implement color conversions, image enhancement, and wavelet convolution filters. Large double data rate (DDR) synchronous dynamic random access memory (SDRAM) (1930) is integrated for frame sequence buffering and inter-image processing. The entire assembly can be powered using 24 VDC batteries (1950) for remote operation, or AC adapters for traditional continuous deployment. The results can be output via a variety of communication paths (1940) including, but in no way limited to, wireless or Ethernet modules integrated with the SOS, USB port, or via the universal asynchronous receiver-transmitter (UART).

A distinct advantage to the SOS (1900) is that the architecture permits one or more video streams from existing sensors (1910) to be multiplexed into the SOS so that the image processing algorithms can be applied to existing NTSC-based surveillance infrastructures. Additionally, a number of interfaces for other modules are provisioned to the SOS (1900) such as, but not limited to, a global positioning system (GPS) and electronic compass modules that facilitate camera positioning and target location information. Additional algorithms that my be included in SOS (1900) include, but are in no way limited to, a video content analysis suite (including target detection, face recognition, etc.), an image enhancement suite (including video stabilization, image fusion, super resolution), and an integration and control suite (including target positioning and terrain mapping, control messaging, and zone detection).

In conclusion, the present system and method for controlling deflection of a radiation to be received by one or more radiation sensors allows for greater control and application of radiation. More specifically, the present system and method relate to devices and methods that control a reflective material (mirror) to adjust the optical path of one or more substantially stationary optical sensors. By controlling the orientation of the reflective material rather than varying the position of the optical sensor, the present surveillance device has lower power requirements, a reduced size, and reduced weight when compared to traditional surveillance devices. Additionally, the present surveillance methods and apparatuses may be used in many applications including, but not limited to, military night sights and driving aids to area surveillance, firefighting, industrial radiometry, search and rescue, border patrol and vehicle collision-avoidance.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A radiation sensor system comprising
   a radiation responsive sensor,
   a first optical pat through said system to said sensor,
   a second optical path through said system to said sensor, and
   a radiation reflective member for selectively directing incident radiation through either said first or second optical pat to said sensor,
   wherein a field-of-view presented to said sensor is narrowed when said radiation reflective member directs said incident radiation through said second optical path.

2. The sensor system of claim 1 wherein said sensor is fixedly mounted relative to said reflective member and wherein said sensor has a spectral range selected from a group comprising either visible, infrared, near infrared or medium-long wave infrared radiation.

3. The sensor system of claim 2, further comprising a second reflective member optically coupled to said sensor trough both said first and second optical paths, wherein said second reflective member moves so as to rotate said field-of-view through 360-degrees.

4. The sensor system of claim 3, wherein said 360-degree coverage is obtained by:
   spinning said movable second reflective member 360-degrees; and
   performing a substantially continuous processing of images obtained during said spinning.

5. The sensor system of claim 4, wherein said sensor system is further configured to generate a substantially continuous video of said images.

6. The sensor system of claim 1, further comprising a second reflective member that is optically coupled with said sensor and moveable to facilitate pan, tilt, or zoom functions.

7. The sensor system of claim 6, further comprising a single axis motor configured to move said second reflective member to accomplish a 360-degree field of coverage for said sensor.

8. The sensor system of claim 6, wherein said second reflective member comprises:
   a first mirror and a second mirror;
   wherein said first mirror is coupled to a first motor, said first motor configured to accomplish a 360-degree rotation of said first mirror; and
   a second motor coupled to said second mirror, wherein said second motor is configured to move said second mirror to achieve pan and tilt capabilities for the field-of-view of said sensor.

9. The sensor system of claim 8, wherein said radiation responsive sensor includes an optical zoom sensor function.

10. The sensor system of claim 1, wherein said second optical path is longer than said first optical path.

11. A surveillance system comprising:
    a first radiation sensor;
    a second radiation sensor, said first and second radiation sensors being positionally fixed;
    a first radiation reflecting member configured to provide up to a 360-degree field of coverage to said first sensor; and
    a retractable "L" shaped reflecting member configured to provide a selectively varying field of view to said second sensor.

12. The surveillance system of claim 11, further comprising:
    a motor configured to selectively rotate said first radiation reflecting member with respect to said first radiation sensor; and
    a motor configured to selectively retract said "L" shaped reflecting member.

13. The surveillance system of claim 11, wherein said first radiation sensor comprises one of a visible radiation sensor, an infrared radiation sensor, a near infrared radiation sensor, or a medium-long wave infrared radiation sensor.

14. The surveillance system of claim 11, wherein said second radiation sensor comprises one of a visible radiation sensor, an infrared radiation sensor, a near infrared radiation sensor, or a medium-long wave infrared radiation sensor.

15. The surveillance system of claim 11, wherein said first radiation sensor, said second radiation sensor, said first radiation reflective member, and said second radiation reflective member are coupled in a vertical configuration along a single vertical axis.

16. The surveillance system of claim 11, further comprising a dual axis motor;
    wherein a first axis of said dual axis motor is configured to selectively rotate said first and second radiation reflecting members with respect to said first and second radiation sensors; and
    wherein a second axis of said dual axis motor is configured to provide pan, tilt, or zoom functionality to said first sensor.

17. The surveillance system of claim 11, wherein said first radiation reflective surface is configured to provide up to a 360-degree wide field of view to said first radiation sensor.

18. The surveillance system of claim 11, further comprising logic means configured to selectively fuse a plurality of sensor elements generated by said first radiation sensor and said secondary sensor.

19. A surveillance vehicle comprising:
    a telescoping base coupled to said surveillance vehicle;
    a Stewart platform coupled to said telescoping base, said Stewart platform including a base, a movable top platform, and a plurality of linear actuators movably coupling said top platforms to said base in a cubic configuration; and
    a radiation surveillance sensor system including a radiation responsive sensor, a radiation reflective member for selectively adjusting the incident radiation path to salad sensor, and a power means for controlling the position of said reflective member to achieve selectable view locations of said sensor.

20. The surveillance vehicle of claim 19, wherein said surveillance vehicle comprises a remote controlled vehicle.

21. The surveillance vehicle of claim 20, wherein said radiation surveillance sensor system is configured to identify possible targets.

22. A surveillance system comprising:
    a first radiation sensor;
    a second radiation sensor, separate from said first radiation sensor; and
    at least one moveable radiation reflecting member configured to provide, through its movement, a selectively varying field of view to said first sensor and said second sensor;
    wherein said reflecting member comprises:
    a first mirror; and
    a second mirror rotatably coupled to said first mirror;
    wherein said first mirror is configured to direct radiation to said first radiation sensor and said second mirror is configured to direct radiation to said second radiation sensor.

23. The surveillance system of claim 22, wherein said first radiation sensor, said second radiation sensor, said first mirror, and said second mirror are coupled in a linear configuration along a single linear axis.

24. A surveillance system comprising:
    a first radiation sensor;
    a second radiation sensor, separate from said first radiation sensor;
    at least one moveable radiation reflecting member configured to provide, through its movement, a selectively varying field of view to said first sensor and said second sensor;
    a first optical path to said second sensor; and
    a second optical path to said second sensor, said second optical path being longer than said first optical path;
    wherein said moveable radiation reflecting member moves between first and second positions to direct incident light into, respectively, said first and second optical paths; and
    wherein a field of view provided to said second sensor is narrowed when said moveable radiation reflecting member is in said second position.

25. The surveillance system of claim 24, wherein said second sensor is an infrared sensor.

26. The surveillance system of claim 24, further comprising a second moveable radiation reflecting member optically coupled with said first and second radiation sensor, wherein said second moveable radiation reflecting member rotates to move said field of view of said first and second sensors through 360-degrees.

27. A surveillance system comprising:
    a first radiation sensor;
    a second radiation sensor, separate from said first radiation sensor;

at least one moveable radiation reflecting member configured to provide, through its movement, a selectively varying field of view to said first sensor and said second sensor; and a dual axis motor;

wherein a first axis of said dual axis motor is configured to selectively rotate said radiation reflecting member with respect to said first and second radiation sensors; and wherein a second axis of said dual axis motor is configured to provide pan, tilt, or zoom functionality to said first sensor.

28. A system for varying a field of view to a plurality of radiation sensors, comprising:

a rotatable radiation reflective member configured to rotate through 360-degrees to direct incident radiation from 360-degrees into said system;

a first radiation sensor optically coupled with said rotatable reflective member;

a second radiation sensor optically coupled with said rotatable reflective member;

a selectively reflective member disposed between said rotatable radiation reflective member and said first radiation sensor, wherein said selectively reflective member is configured to selectively reflect a portion of said incident radiation to said second radiation sensor while passing a portion of said incident radiation though to said first sensor; and a radiation modifier disposed between said selectively reflective surface and said second radiation sensor, wherein said radiation modifier is configured to selectively modify a field of view of said second sensor;

wherein said radiation modifier comprises a selectively translatable lens.

29. A method for selectively controlling deflection of radiation from a field to be monitored by generating a 360-degree panoramic field of view comprising:

fixedly positioning a first radiation sensor and a second radiation sensor for receiving radiation from a field to be observed, wherein said first and second radiation sensors sense different wavelength bands, movably positioning a reflective surface for selectively reflecting radiation from the field to be observed to the first and second sensors, rotatably driving said reflective surface to selectively reflect radiation from said surface to said fixedly mounted sensors to achieve up to a 360 degree panoramic view, and selectively switching a second reflective surface between first and second positions to achieve a dual field of view for a single radiation aperture associated with said second sensor.

30. A method for selectively controlling deflection of radiation from a field comprising:

fixedly positioning a radiation sensor for receiving radiation from a field to be observed, movably positioning a reflector for selectively reflecting radiation from the field to be observed towards the sensor, wherein said reflector includes a plurality of reflective surfaces; and pivoting said reflector to alternate between said plurality of reflective surfaces, each reflective surface providing a different field of view to said radiation sensor; and utilizing a continuous feedback loop to adjust which reflective surface of said reflector is affecting said field of view.

31. A surveillance system comprising:

a first radiation sensor;

a second radiation sensor, separate from said first radiation sensor; and at least one moveable radiation reflecting member configured to provide, through its movement, a selectively varying field of view to said first sensor and said second sensor; and a second reflecting member configured to direct incident radiation to said radiation sensor from a 360-degree range of directions;

wherein said second reflecting member comprises a parabolic mirror.

* * * * *

UNITED STATES PATENT AND TRADEMARK OFFICE
CERTIFICATE OF CORRECTION

PATENT NO. : 7,358,498 B2 Page 1 of 1
APPLICATION NO. : 10/912430
DATED : April 15, 2008
INVENTOR(S) : Z. Jason Geng et al.

It is certified that error appears in the above-identified patent and that said Letters Patent is hereby corrected as shown below:

Column 20, Line 36, Claim 1, change "a first optical pat through" to --a first optical path through--

Column 20, Line 41, Claim 1, change "optical pat to said sensor," to --optical path to said sensor,--

Column 20, Line 52, Claim 3, change "coupled to said sensor trough both said first" to --coupled to said sensor through both said first--

Column 22, Line 9, Claim 19, change "radiation path to salad sensor," to --radiation path to said sensor,--

Column 23, Line 28, Claim 28, change "incident radiation though to said first" to --incident radiation through to said first--

Signed and Sealed this

First Day of July, 2008

JON W. DUDAS
*Director of the United States Patent and Trademark Office*